US012563461B2

(12) United States Patent
Papillon et al.

(10) Patent No.: US 12,563,461 B2
(45) Date of Patent: Feb. 24, 2026

(54) DISTRIBUTED MACHINE LEARNING SOLUTION FOR ROGUE BASE STATION DETECTION

(71) Applicant: Nokia Technologies Oy, Espoo (FI)

(72) Inventors: Serge Papillon, Massy (FR); Afef Feki, Massy (FR); Koffi Ismael Ouattara, Nozay (FR); Anna Pantelidou, Massy (FR)

(73) Assignee: Nokia Technologies Oy, Espoo (FI)

( * ) Notice: Subject to any disclaimer, the term of this patent is extended or adjusted under 35 U.S.C. 154(b) by 399 days.

(21) Appl. No.: 18/480,318

(22) Filed: Oct. 3, 2023

(65) Prior Publication Data

US 2024/0121678 A1 Apr. 11, 2024

(30) Foreign Application Priority Data

Oct. 6, 2022 (FI) ..................................... 20225899

(51) Int. Cl.
*H04W 36/00* (2009.01)

(52) U.S. Cl.
CPC . *H04W 36/00833* (2023.05); *H04W 36/0085* (2018.08)

(58) Field of Classification Search
CPC .................... H04W 36/00833; H04W 36/0085
See application file for complete search history.

(56) References Cited

U.S. PATENT DOCUMENTS

| | | | |
|---|---|---|---|
| 2012/0088507 A1 | 4/2012 | Legg et al. | |
| 2019/0132787 A1* | 5/2019 | Ryan ..................... | H04W 12/12 |
| 2020/0007385 A1 | 1/2020 | Obaidi | |
| 2022/0060901 A1 | 2/2022 | Rajendran et al. | |

(Continued)

FOREIGN PATENT DOCUMENTS

| | | |
|---|---|---|
| CN | 114501456 A | 5/2022 |
| WO | 2021/001480 A1 | 1/2021 |

(Continued)

OTHER PUBLICATIONS

Extended European Search Report received for corresponding European Patent Application No. 23201579.2, dated Feb. 7, 2024, 13 pages.

(Continued)

*Primary Examiner* — Ricky Q Ngo
*Assistant Examiner* — Andrew Shaji Kurian
(74) *Attorney, Agent, or Firm* — Nokia Technologies Oy

(57) ABSTRACT

An apparatus configured to: obtain an indication of partitions of a machine learning model corresponding to respective ones of the one or more groups; transmit, to the respective ones of the plurality of user equipments, a corresponding partition, of the partitions of the machine learning model; transmit, to the plurality of user equipments, an indication to record measurements for the first cell; receive, from at least one of the plurality of user equipments, at least one message regarding a handover failure, wherein the at least one message comprises a message generated using a first partition of the partitions of the machine learning model; and determine, with a second partition of the partitions of the machine learning model, whether the first cell is a rogue base station based, at least partially, on a plurality of detection reports.

11 Claims, 16 Drawing Sheets

(56)     References Cited

U.S. PATENT DOCUMENTS

| 2022/0167216 | A1 | 5/2022 | Kolekar et al. | |
|---|---|---|---|---|
| 2022/0286927 | A1 | 9/2022 | Madadi et al. | |
| 2023/0060250 | A1* | 3/2023 | Kumar | H04W 24/10 |
| 2024/0031899 | A1* | 1/2024 | Filin | H04W 36/30 |
| 2024/0089046 | A1* | 3/2024 | Saraf | H04W 72/12 |
| 2025/0358860 | A1* | 11/2025 | Wang | H04W 74/0833 |

FOREIGN PATENT DOCUMENTS

| WO | 2021/094221 | A1 | 5/2021 |
|---|---|---|---|
| WO | 2021/154144 | A1 | 8/2021 |
| WO | 2022/003490 | A1 | 1/2022 |
| WO | 2022/207093 | A1 | 10/2022 |

OTHER PUBLICATIONS

"Discussion on AIML Methods", 3GPP TSG-RAN WG2 Meeting #119bis electronic, R2-2210520, Agenda: 8.16.2, Rakuten Mobile Inc.,Oct. 2022, 11 pages.

"Consideration of use case specific aspects", 3GPP TSG-RAN WG2 Meeting #119-bis electronic, R2-2209565, Agenda: 8.16.3, vivo, Oct. 10-19, 2022, 12 pages.

"3rd Generation Partnership Project; Technical Specification Group Services and System Aspects Study on 5G Security Enhancement against False Base Stations (FBS) (Release 17)", 3GPP TR 33.809, V0.17.0, Nov. 2021, pp. 1-129.

"3rd Generation Partnership Project; Technical Specification Group Core Network and Terminals; 5G System; Network Data Analytics Services; Stage 3 (Release 17)", 3GPP TS 29.520, V17.7.0, Jun. 2022, pp. 1-238.

"3rd Generation Partnership Project; Technical Specification Group Radio Access Network; NG-RAN; F1 application protocol (F1AP) (Release 17)", 3GPP TS 38.473, V17.1.0, Jun. 2022, pp. 1-667.

"3rd Generation Partnership Project; Technical Specification Group Services and System Aspects Study on 5G Security Enhancement against False Base Stations (FBS) (Release 18)", 3GPP TR 33.809, V0.18.0, Feb. 2022, pp. 1-130.

"3rd Generation Partnership Project; Technical Specification Group Services and System Aspects; Study on traffic characteristics and performance requirements for AI/ML model transfer in 5GS (Release 18)", 3GPP TR 22.874, V18.1.0, Sep. 2021, pp. 1-111.

"Detecting false base stations in mobile networks", Ericsson, Retrieved on Oct. 30, 2023, Webpage available at : https://www.ericsson.com/en/blog/2018/6/detecting-false-base-stations-in-mobile-networks.

"dl-4-tsc/png/fcn.png at master • hfawaz/dl-4-tsc", GitHub, Retrieved on Oct. 30, 2023, Webpage available at : https://github.com/hfawaz/dl-4-tsc/blob/master/png/fcn.png.

"dl-4-tsc/png/resnet-archi.png at master • hfawaz/dl-4-tsc", GitHub, Retrieved on Oct. 30, 2023, Webpage available at : https://github.com/hfawaz/dl-4-tsc/blob/master/png/resnet-archi.png.

"UE assisted analytics for false base station detection", SA WG2 Meeting #139e, S2-2003760, Agenda: 8.1, OPPO, Jun. 1-12, 2020, pp. 1-3.

Nakarmi et al., "Murat: Multi-RAT False Base Station Detector", arXiv, Feb. 17, 2021, pp. 1-13.

Office action received for corresponding Finnish Patent Application No. 20225899, dated Feb. 24, 2023, 15 pages.

Office action received for corresponding Finnish Patent Application No. 20225899, dated Aug. 7, 2023, 12 pages.

* cited by examiner

Phase 1:
ML Preparation and information gathering

410

Phase 2:
ML training and model split set up

420

Phase 3:
ML inference with splitting option

430

Collect ML UEs states — 1110

Group UEs — 1120

Send UEs state to NWDAF — 1130

Get splitted ML model per UE group — 1140

Send appropriate ML model to each UE according to classification — 1150

1500

1510 | determine that a first cell is experiencing a rate of handover failure at or above a first threshold

1520 | determine a list of physical cell identifiers of cells active at a time of the first cell experiencing the rate of handover failure at or above the first threshold, wherein the list of physical cell identifiers comprises, at least, a physical cell identifier associated with the first cell

1530 | obtain information related to a plurality of user equipments, wherein respective ones of the plurality of user equipments have reported a reference signal received power measurement associated with at least one physical cell identifier of the determined list of physical cell identifiers

1540 | categorize the plurality of user equipments into one or more groups of user equipments based, at least partially, on the obtained information

1550 | obtain an indication of partitions of a machine learning model corresponding to respective ones of the one or more groups

1560 | transmit, to the respective ones of the plurality of user equipments, a corresponding partition, of the partitions of the machine learning model, based, at least partially, on the one or more groups of the plurality of user equipments

1570 | transmit, to the plurality of user equipments, an indication to record measurements for the first cell with a configured frequency for a configured time period

1580 receive, from at least one of the plurality of user equipments, at least one message regarding a handover failure, wherein the at least one message comprises a message generated using a first partition of the partitions of the machine learning model

determine, with a second partition of the partitions of the machine learning model, whether the first cell is a rogue base station based, at least partially, on a plurality of detection reports, wherein the plurality of detection reports comprises, at least, the at least one received message

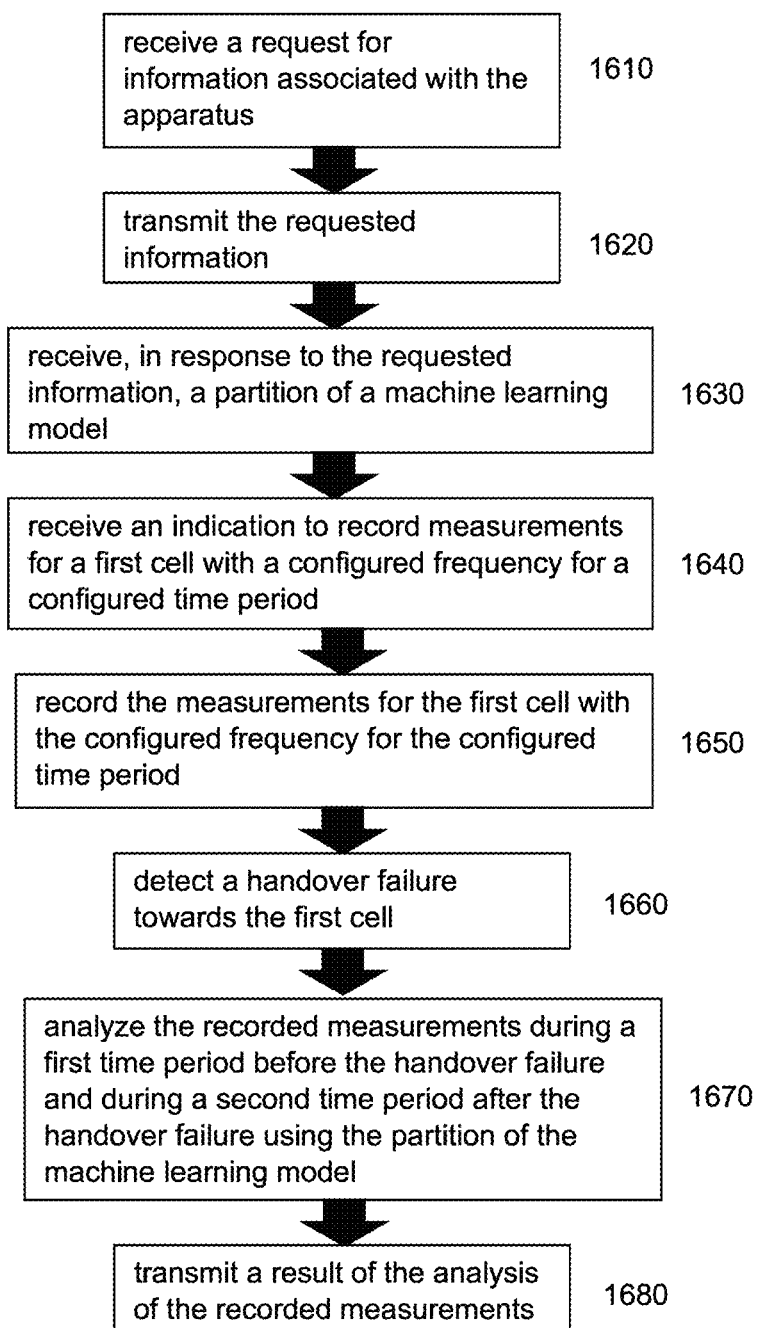

receive a request for information associated with the apparatus    1610 transmit the requested information    1620 receive, in response to the requested information, a partition of a machine learning model    1630 receive an indication to record measurements for a first cell with a configured frequency for a configured time period    1640 record the measurements for the first cell with the configured frequency for the configured time period    1650 detect a handover failure towards the first cell    1660 analyze the recorded measurements during a first time period before the handover failure and during a second time period after the handover failure using the partition of the machine learning model    1670 transmit a result of the analysis of the recorded measurements    1680

FIG. 16

DISTRIBUTED MACHINE LEARNING SOLUTION FOR ROGUE BASE STATION DETECTION

TECHNICAL FIELD

The example and non-limiting embodiments relate generally to handover and, more particularly, to security risk(s) associated with handover.

BACKGROUND

It is known, in telecommunications, to detect rogue base stations based on UE measurement reports at the network level.

SUMMARY

The following summary is merely intended to be illustrative. The summary is not intended to limit the scope of the claims.

In accordance with one aspect, an apparatus comprising: at least one processor; and at least one memory storing instructions that, when executed by the at least one processor, cause the apparatus at least to: determine that a first cell is experiencing a rate of handover failure at or above a first threshold; determine a list of physical cell identifiers of cells active at a time of the first cell experiencing the rate of handover failure at or above the first threshold, wherein the list of physical cell identifiers comprises, at least, a physical cell identifier associated with the first cell; obtain information related to a plurality of user equipments, wherein respective ones of the plurality of user equipments have reported a reference signal received power measurement associated with at least one physical cell identifier of the determined list of physical cell identifiers; categorize the plurality of user equipments into one or more groups of user equipments based, at least partially, on the obtained information; obtain an indication of partitions of a machine learning model corresponding to respective ones of the one or more groups; transmit, to the respective ones of the plurality of user equipments, a corresponding partition, of the partitions of the machine learning model, based, at least partially, on the one or more groups of the plurality of user equipments; transmit, to the plurality of user equipments, an indication to record measurements for the first cell with a configured frequency for a configured time period; receive, from at least one of the plurality of user equipments, at least one message regarding a handover failure, wherein the at least one message comprises a message generated using a first partition of the partitions of the machine learning model; and determine, with a second partition of the partitions of the machine learning model, whether the first cell is a rogue base station based, at least partially, on a plurality of detection reports, wherein the plurality of detection reports comprises, at least, the at least one received message.

In accordance with one aspect, a method comprising: determining, with a first user equipment, that a first cell is experiencing a rate of handover failure at or above a first threshold; determining a list of physical cell identifiers of cells active at a time of the first cell experiencing the rate of handover failure at or above the first threshold, wherein the list of physical cell identifiers comprises, at least, a physical cell identifier associated with the first cell; obtaining information related to a plurality of user equipments, wherein respective ones of the plurality of user equipments have reported a reference signal received power measurement associated with at least one physical cell identifier of the determined list of physical cell identifiers; categorizing the plurality of user equipments into one or more groups of user equipments based, at least partially, on the obtained information; obtaining an indication of partitions of a machine learning model corresponding to respective ones of the one or more groups; transmitting, to the respective ones of the plurality of user equipments, a corresponding partition, of the partitions of the machine learning model, based, at least partially, on the one or more groups of the plurality of user equipments; transmitting, to the plurality of user equipments, an indication to record measurements for the first cell with a configured frequency for a configured time period; receiving, from at least one of the plurality of user equipments, at least one message regarding a handover failure, wherein the at least one message comprises a message generated using a first partition of the partitions of the machine learning model; and determining, with a second partition of the partitions of the machine learning model, whether the first cell is a rogue base station based, at least partially, on a plurality of detection reports, wherein the plurality of detection reports comprises, at least, the at least one received message.

In accordance with one aspect, an apparatus comprising means for performing: determining that a first cell is experiencing a rate of handover failure at or above a first threshold; determining a list of physical cell identifiers of cells active at a time of the first cell experiencing the rate of handover failure at or above the first threshold, wherein the list of physical cell identifiers comprises, at least, a physical cell identifier associated with the first cell; obtaining information related to a plurality of user equipments, wherein respective ones of the plurality of user equipments have reported a reference signal received power measurement associated with at least one physical cell identifier of the determined list of physical cell identifiers; categorizing the plurality of user equipments into one or more groups of user equipments based, at least partially, on the obtained information; obtaining an indication of partitions of a machine learning model corresponding to respective ones of the one or more groups; transmitting, to the respective ones of the plurality of user equipments, a corresponding partition, of the partitions of the machine learning model, based, at least partially, on the one or more groups of the plurality of user equipments; transmitting, to the plurality of user equipments, an indication to record measurements for the first cell with a configured frequency for a configured time period; receiving, from at least one of the plurality of user equipments, at least one message regarding a handover failure, wherein the at least one message comprises a message generated using a first partition of the partitions of the machine learning model; and determining, with a second partition of the partitions of the machine learning model, whether the first cell is a rogue base station based, at least partially, on a plurality of detection reports, wherein the plurality of detection reports comprises, at least, the at least one received message.

In accordance with one aspect, a non-transitory computer-readable medium comprising program instructions stored thereon for performing at least the following: determining that a first cell is experiencing a rate of handover failure at or above a first threshold; determining a list of physical cell identifiers of cells active at a time of the first cell experiencing the rate of handover failure at or above the first threshold, wherein the list of physical cell identifiers comprises, at least, a physical cell identifier associated with the first cell; obtaining information related to a plurality of user equipments, wherein respective ones of the plurality of user equipments have reported a reference signal received power measurement associated with at least one physical cell identifier of the determined list of physical cell identifiers; categorizing the plurality of user equipments into one or more groups of user equipments based, at least partially, on the obtained information; obtaining an indication of partitions of a machine learning model corresponding to respective ones of the one or more groups; causing transmitting, to the respective ones of the plurality of user equipments, of a corresponding partition, of the partitions of the machine learning model, based, at least partially, on the one or more groups of the plurality of user equipments; causing transmitting, to the plurality of user equipments, of an indication to record measurements for the first cell with a configured frequency for a configured time period; causing receiving, from at least one of the plurality of user equipments, of at least one message regarding a handover failure, wherein the at least one message comprises a message generated using a first partition of the partitions of the machine learning model; and determining, with a second partition of the partitions of the machine learning model, whether the first cell is a rogue base station based, at least partially, on a plurality of detection reports, wherein the plurality of detection reports comprises, at least, the at least one received message.

In accordance with one aspect, an apparatus comprising: at least one processor; and at least one memory storing instructions that, when executed by the at least one processor, cause the apparatus at least to: receive a request for information associated with the apparatus; transmit the requested information; receive, in response to the requested information, a partition of a machine learning model; receive an indication to record measurements for a first cell with a configured frequency for a configured time period; record the measurements for the first cell with the configured frequency for the configured time period; detect a handover failure towards the first cell; analyze the recorded measurements during a first time period before the handover failure and during a second time period after the handover failure using the partition of the machine learning model; and transmit a result of the analysis of the recorded measurements.

In accordance with one aspect, a method comprising: receiving, with a user equipment, a request for information associated with the user equipment; transmitting the requested information; receiving, in response to the requested information, a partition of a machine learning model; receiving an indication to record measurements for a first cell with a configured frequency for a configured time period; recording the measurements for the first cell with the configured frequency for the configured time period; detecting a handover failure towards the first cell; analyzing the recorded measurements during a first time period before the handover failure and during a second time period after the handover failure using the partition of the machine learning model; and transmitting a result of the analysis of the recorded measurements.

In accordance with one aspect, an apparatus comprising means for performing: receiving a request for information associated with the apparatus; transmitting the requested information; receiving, in response to the requested information, a partition of a machine learning model; receiving an indication to record measurements for a first cell with a configured frequency for a configured time period; recording the measurements for the first cell with the configured frequency for the configured time period; detecting a handover failure towards the first cell; analyzing the recorded measurements during a first time period before the handover failure and during a second time period after the handover failure using the partition of the machine learning model; and transmitting a result of the analysis of the recorded measurements.

In accordance with one aspect, a non-transitory computer-readable medium comprising program instructions stored thereon for performing at least the following: causing receiving of a request for information associated with a user equipment; causing transmitting of the requested information; causing receiving, in response to the requested information, of a partition of a machine learning model; causing receiving of an indication to record measurements for a first cell with a configured frequency for a configured time period; recording the measurements for the first cell with the configured frequency for the configured time period; detecting a handover failure towards the first cell; analyzing the recorded measurements during a first time period before the handover failure and during a second time period after the handover failure using the partition of the machine learning model; and causing transmitting of a result of the analysis of the recorded measurements.

According to some aspects, there is provided the subject matter of the independent claims. Some further aspects are defined in the dependent claims.

BRIEF DESCRIPTION OF THE DRAWINGS

The foregoing aspects and other features are explained in the following description, taken in connection with the accompanying drawings, wherein:

FIG. 15 is a flowchart illustrating steps as described herein; and

FIG. 16 is a flowchart illustrating steps as described herein.

DETAILED DESCRIPTION OF EMBODIMENTS

Figure 1:
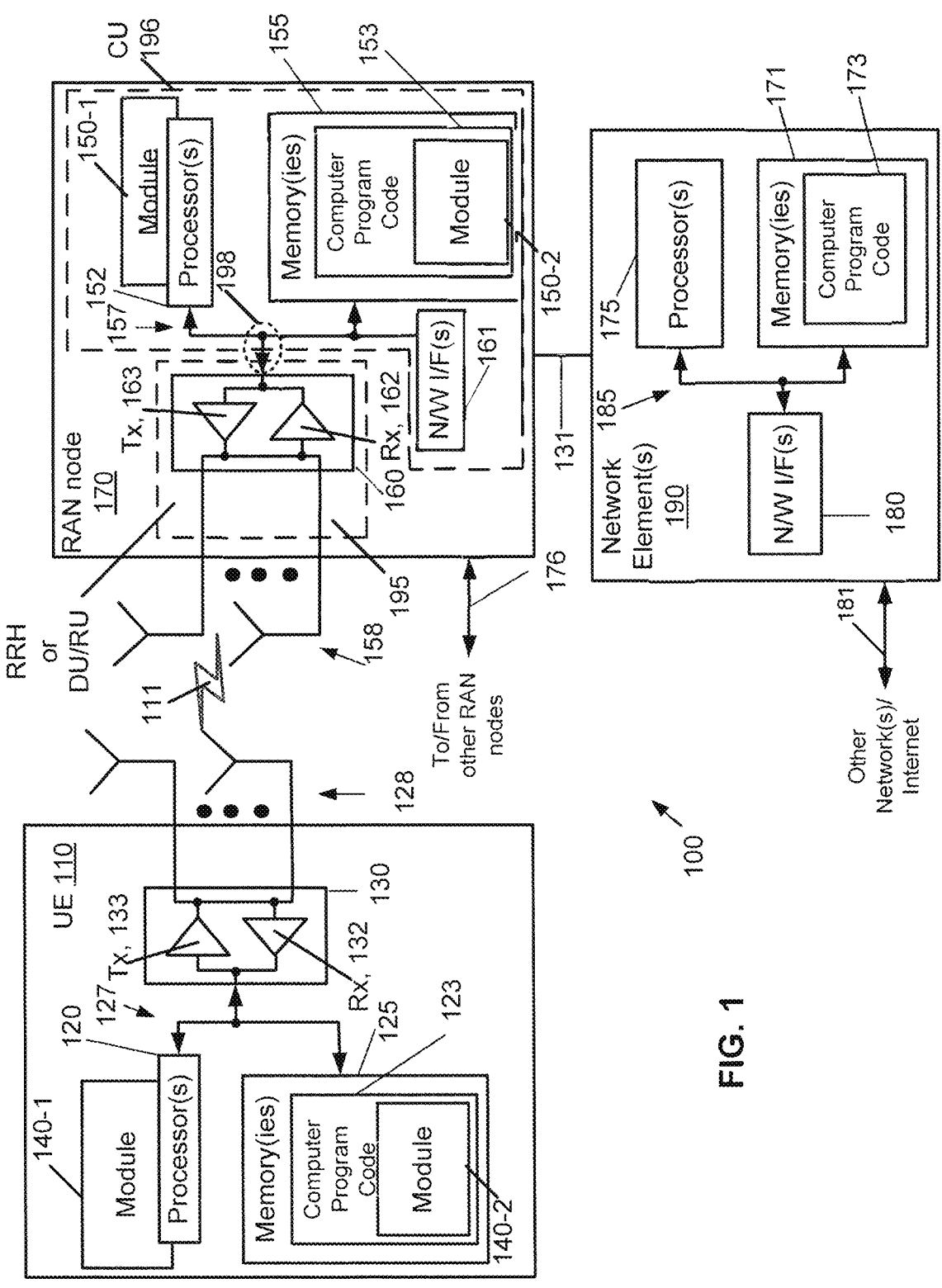
FIG. 1 is a block diagram of one possible and non-limiting example system in which the example embodiments may be practiced.

The following abbreviations that may be found in the specification and/or the drawing figures are defined as follows:

| 3GPP | third generation partnership project |
|---|---|
| 5G | fifth generation |
| 5GC | 5G core network |
| AI | artificial intelligence |
| AMF | access and mobility management function |
| CNN | convolutional neural network |
| cRAN | cloud radio access network |
| CU | central unit |
| DoS | denial of service |
| DU | distributed unit |
| eNB (or eNodeB) | evolved Node B (e.g., an LTE base station) |
| EN-DC | E-UTRA-NR dual connectivity |
| en-gNB or En-gNB | node providing NR user plane and control plane protocol terminations towards the UE, and acting as secondary node in EN-DC |
| E-UTRA | evolved universal terrestrial radio access, i.e., the LTE radio access technology |
| gNB (or gNodeB) | base station for 5G/NR, i.e., a node providing NR user plane and control plane protocol terminations towards the UE, and connected via the NG interface to the 5GC |
| IAB MT | integrated access and backhaul mobile terminal |
| I/F | interface |
| IDPS | intelligent detection and prediction for security |
| IMSI | international mobile subscriber identity |
| KGCN | knowledge graph convolutional network |
| L1 | layer 1 |
| LTE | long term evolution |
| MAC | medium access control |
| MDAF | Management Data Analytics Function |
| MIB | master information block |
| ML | machine learning |
| MME | mobility management entity |
| MSE | mean squared error |
| ng or NG | new generation |
| ng-eNB or NG-eNB | new generation eNB |
| NN | neural network |
| NR | new radio |
| N/W or NW | network |
| NWDAF | network data analytics function |
| OAM | operations, administration, and maintenance |
| O-RAN | open radio access network |
| PCI | physical cell ID |
| PDCP | packet data convergence protocol |
| PHY | physical layer |
| RAN | radio access network |
| RedCap | reduced capability |
| resnet/ResNet | residual neural network |
| RF | radio frequency |
| RIC | radio intelligent controller |
| RLC | radio link control |
| RRC | radio resource control |
| RRH | remote radio head |
| RS | reference signal |
| RSRP | reference signal received power |
| RU | radio unit |
| Rx | receiver |
| SDAP | service data adaptation protocol |
| SGW | serving gateway |
| SIB | system information block |
| SINR | signal interference plus noise ratio |
| SMF | session management function |
| Tx | transmitter |
| UE | user equipment (e.g., a wireless, typically mobile device) |
| UPF | user plane function |
| VNR | virtualized network function |

Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. A "circuit" may include dedicated hardware or hardware in association with software executable thereon. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell may be supported by one or more gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station, access point, access node, or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown. The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicates over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely illustrative functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. For example, a network may be deployed in a tele cloud, with virtualized network functions (VNF) running on, for example, data center servers. For example, network core functions and/or radio access network(s) (e.g. CloudRAN, O-RAN, edge cloud) may be virtualized. Note that the virtualized entities that result from the network virtualization are still implemented, at some level, using hardware such as processors 152 or 175 and memories 155 and 171, and also such virtualized entities create technical effects.

It may also be noted that operations of example embodiments of the present disclosure may be carried out by a plurality of cooperating devices (e.g. cRAN).

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various example embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the example embodiments of the present disclosure, example embodiments will now be described with greater specificity.

Features as described herein generally relate to the Radio Access Network part of a telecommunications network, standardized by the 3GPP (https://www.3gpp.org). More specifically, features as described herein may relate to the protocols and functions where a user equipment (UE) attaches to a base station of the network and, during the UE mobility, where the UE changes its serving base station (e.g.

the handover procedure). In all generations of telecommunication network (from 2G to 5G), the base stations advertise their presence by sending over the air some connection information (e.g. Master Information Blocks (MIB) and System Information Blocks (SIB)). However, this information may be gathered by an attacker that may use the information to configure its own rogue base station to impersonate a base station of the telecommunication network.

The 3GPP standard organization has devoted a specific technical report to this problem: the 3GPP TR 33.809, Study of security Enhancement against False Base Stations (https://www.3gpp.org/ftp/Specs/archive/33_series/33.809/33809-0i0.zip) (3GPP TR 33.809 V0.18.0 (2022-02); Technical Report; 3rd Generation Partnership Project; Technical Specification Group Services and System Aspects; Study on 5G Security Enhancement against False Base Stations (FBS) (Release 18)).

TR 22.874 (3GPP TR 22.874 V18.1.0 (2021-09) Technical Report 3rd Generation Partnership Project; Technical Specification Group Services and System Aspects; Study on traffic characteristics and performance requirements for AI/ML model transfer in 5GS (Release 18)) introduces the Split AI/ML operation between AI/ML endpoints (see section 5). In many cases, splitting the AI/ML inference (e.g. a processing task, or part of a processing task) over device and network is required, to enable AI/ML application(s) with conflicting requirements, which may be computationally-intensive and energy-intensive, as well as privacy-sensitive and delay-sensitive. Processing AI/ML inference with device-network synergy may alleviate the pressure of computation, memory footprint, storage, power and required data rate on devices, reduce end-to-end latency and energy consumption, and improve the end-to-end accuracy and efficiency when compared to the local execution approach on either side.

Figure 2:
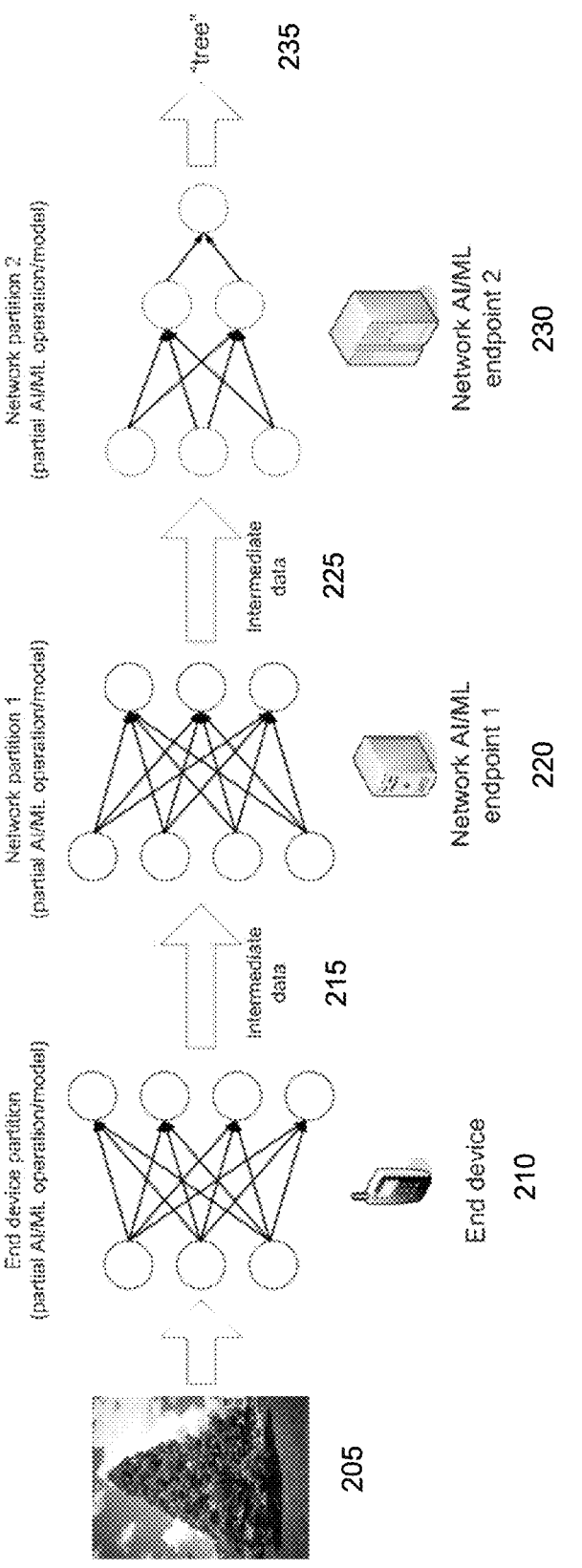
FIG. 2 is a diagram illustrating features as described herein.

Referring now to FIG. 2, illustrated is an example of the scheme of split AI/ML inference from TR 22.874. In this example, an input image 205 may be processed, but this is not limiting; example embodiments of the present disclosure may be applied to any task or type of processing that may be performed with an AI/ML operation/model. The AI/ML operation/model may be split into multiple parts, for example according to the current task and/or environment. The intention may be to offload the computation-intensive, energy-intensive parts to network endpoints (220, 230), whereas the privacy-sensitive and delay-sensitive parts may be left at the end device (210). The device (210) may execute the operation/model up to a specific part/layer, and may send the intermediate data (215) to the network endpoint(s) (220, 230). The network endpoint(s) may execute the remaining parts/layers and feeds the inference results (225, 235) back to the device. It may be noted that, in the example in FIG. 2, the final inference result (235) may be output by network AI/ML endpoint 2 (230). According to an actual use case, the inference result may also be output by other endpoints, for example network AI/ML endpoint 1 (220).

A technical effect of example embodiments of the present disclosure may be to enable detection of rogue base stations in a telecommunication network. Rogue base stations are used by attackers to try to obtain private information of the UE, which may then try to attach to it. Some rogue base stations may scan the MIB of a genuine base stations in order to impersonate them. If such a rogue base station is not that far from the impersonated one, the rogue base station may not be detected by the network using the state of the art techniques.

Rogue base stations that lure UEs to connect or handover to them may be unable to establish a complete connection, as they may be lacking the cryptographic secret of the real operator. This may lead to handover failure(s). The network may consider that the handover failures are due to the impersonated base station (i.e. genuine/non-rogue base station). In some cases, for example if the rate of handover failures provoked by the rogue base station exceeds a certain threshold, this may lead to the (permanent or temporary) blacklisting of the genuine base station.

In some example embodiments, usage of AI/ML for detecting rogue base stations may be designed to run at network level (e.g. gNB, network data analytics function (NWDAF), radio intelligent controller (RIC)) using measurement reports from UEs. However, this may mean that the UE may send frequent reports to the network in order to make sure that these kind of security attacks are detected rapidly before harmful consequences are observed. Even if the reporting is performed in steady manner, detecting method may raise privacy issues (e.g. due to steady reporting of UE information/measurements), and/or delay issues (e.g. when measurement reporting to the network is required, there may always be a transmission delay that intervenes in the detection process).

Rogue base stations are an existing problem in practical deployments since the radio access networks 2G generation. Multiple levels of protections have been added during all the successive generations to protect against this problem. For instance, in 5G, the UE identity (the IMSI) protection has been enhanced by making sure that the IMSI is never transmitted over the air.

In addition, the 3GPP standard organization has devoted a specific technical report to this problem: the 3GPP TR 33.809, Study of security Enhancement against False Base Stations (https://www.3gpp.org/ftp/Specs/archive/33_series/33.809/33809-0i0.zip), which includes several propositions for protection or detection.

In an example embodiment, an intelligent detection and prediction for security (IDPS) method may be implemented using a knowledge graph convolutional network (KGCN). This method may run at the network level (e.g. gNB, NWDAF, RIC) using existing reported event logs and measurement reports from attached UEs. However, as noted above, this may imply privacy issues and/or delay issues.

Figure 3:
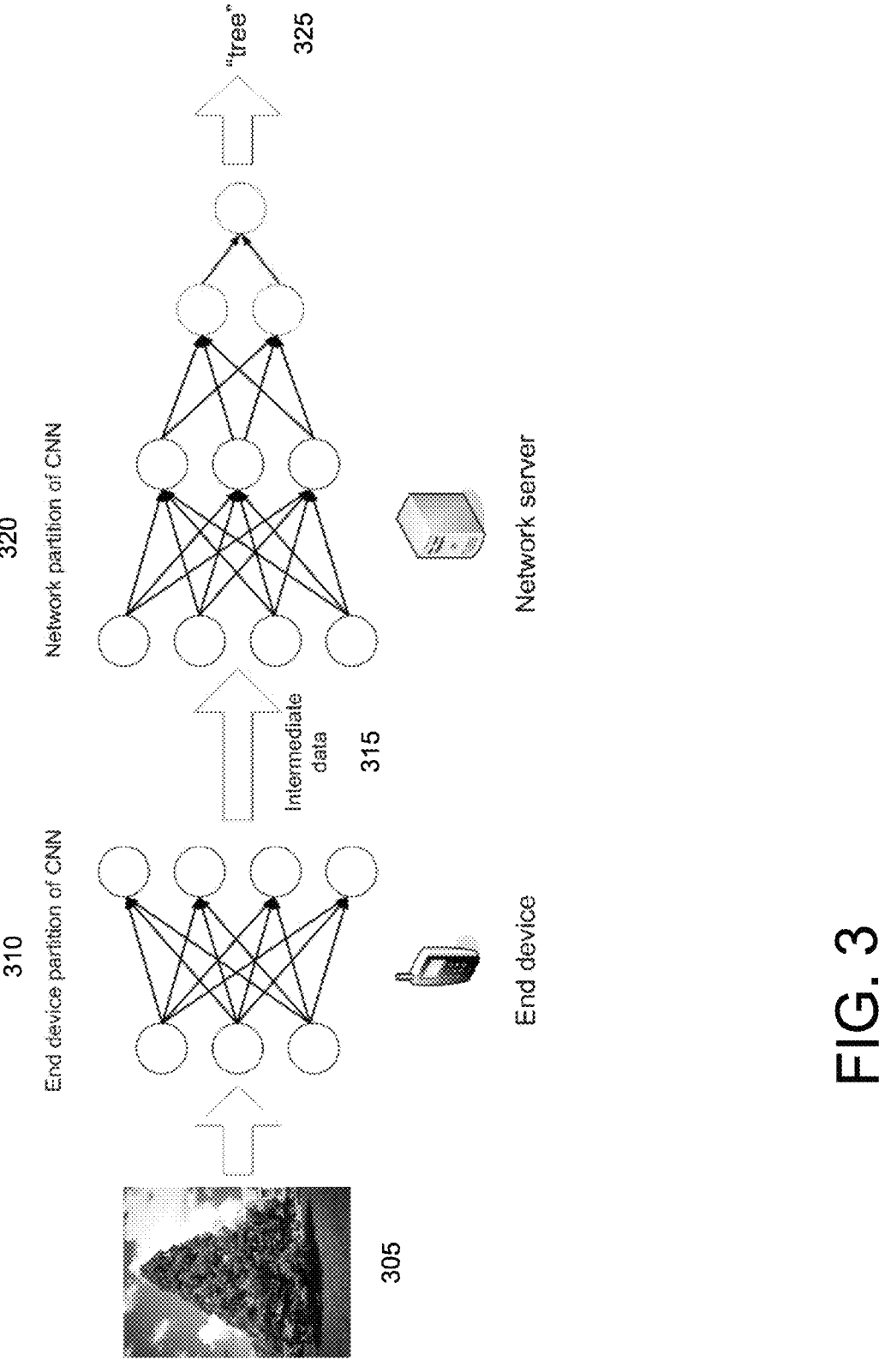
FIG. 3 is a diagram illustrating features as described herein.

Referring now to FIG. 3, illustrated is an example of an AI/ML model split from TR 22.874, which may be applied to applications related to image and video. In the example, the convolutional neural network (CNN) is split into two parts (310, 320) according to the current image recognition task and environment. The intention is to offload the computationally-intensive, energy-intensive parts to network server (320), whereas the privacy-sensitive and delay-sensitive parts are left at the end device (310). The device executes the inference up to a specific CNN layer and sends the intermediate data (315) to the network server (320). The network server (320) runs through the remaining CNN layers to produce the output (325).

A neural network (NN) is a computation graph consisting of two or more layers of computation. Each layer may consist of one or more units, where each unit may perform an elementary computation. A unit may be connected to one or more other units, and the connection may have a weight associated with it. The weight may be used for scaling the signal passing through the associated connection. Weights may be learnable parameters, i.e., values which can be learned from training data. There may be other learnable parameters, such as those of batch-normalization layers.

Two of the most widely used architectures for neural networks are feed-forward and recurrent architectures. Feed-forward neural networks do not comprise a feedback loop; each layer takes input from one or more of the previous layers and provides output, which is used as the input for one or more of the subsequent layers. Units within a layer take input from unit(s) in one or more preceding layers, and provide output to unit(s) of one or more following layers.

Initial layers, i.e. layers close to the input data, extract semantically low-level features from received data, and intermediate and final layers extract more high-level features. After the feature extraction layers there may be one or more layers performing a certain task, such as classification, semantic segmentation, object detection, denoising, style transfer, super-resolution, etc. In recurrent neural networks, there is a feedback loop, so that the network becomes stateful, i.e., it is able to memorize or retain information or a state.

Neural networks may be utilized in an ever increasing number of applications for many different types of device, such as mobile phones, as described above. Examples of applications may include image and video analysis and processing, social media data analysis, device usage data analysis, etc.

Neural networks, and other machine learning tools, may be able to learn properties from input data, either in a supervised way or in an unsupervised way. Such learning may be the result of a training algorithm, or of a meta-level neural network providing a training signal.

A training algorithm may consist of changing some properties of the neural network so that the output of the neural network is as close as possible to a desired output. Training may comprise changing properties of the neural network so as to minimize or decrease the output's error, also referred to as the loss. Examples of losses include mean squared error (MSE), cross-entropy, etc. In recent deep learning techniques, training is an iterative process, where, at each iteration, the algorithm modifies the weights of the neural network to make a gradual improvement of the network's output, i.e., to gradually decrease the loss.

Training a neural network comprises an optimization process, but the final goal of machine learning is different from the typical goal of optimization. In optimization, the goal is to minimize loss. In machine learning generally, in addition to the goal of optimization, the goal is to make the model learn the properties of the data distribution from a limited training dataset. In other words, the training process is additionally used to ensure that the neural network learns to use a limited training dataset in order to learn to generalize to previously unseen data, i.e., data which was not used for training the model. This additional goal is usually referred to as generalization. In practice, data may be split into at least two sets, the training set and the validation set. The training set may be used for training the network, i.e., for modification of its learnable parameters in order to minimize the loss. The validation set may be used for checking the performance of the neural network with data which was not used to minimize the loss (i.e. which was not part of the training set), where the performance of the neural network with the validation set may be an indication of the final performance of the model. The errors on the training set and on the validation set may be monitored during the training process to understand if the neural network is learning at all and if the neural network is learning to generalize. In the case that the network is learning at all, the training set error should decrease. If the network is not learning, the model may be in the regime of underfitting. In the case that the network is learning to generalize, validation set error should decrease and not be much higher than the training set error. If the training set error is low, but the validation set error is much higher than the training set error, or the validation set error does not decrease, or it even increases, the model may be in the regime of overfitting. Overfitting may mean that the model has memorized the training set's properties and performs well only on that set, but performs poorly on a set not used for tuning its parameters. In other words, the model has not learned to generalize.

The split AI/ML operation may be based on the legacy model. Due to the characteristics of some algorithms in the model training phase, a model has a certain degree of robustness. Therefore, if there are errors in the intermediate data transmission, the model may have a certain tolerance and may still be able to guarantee the accuracy of the inference results. Since the inference result may need to be forwarded to the UE, the reliability of the inference result transmission may need to be guaranteed.

In an example embodiment, a distributed machine learning solution may be implemented that may enable the detection of rogue base stations. A technical effect of example embodiments of the present disclosure may be to overcome delay issues and preserve the privacy of UEs.

In an example embodiment, the machine learning model may be split into a first ML partition running at the UE level, and a second ML partition running at the network level (e.g. gNB, NWDAF or RIC). In an example embodiment, this splitting may be performed on a per UE basis. In an example embodiment, this splitting may be tailored to each UE specification(s) and ability(s). A technical effect of example embodiments of the present disclosure may be that different ML splits may result for different UEs.

Figure 4:
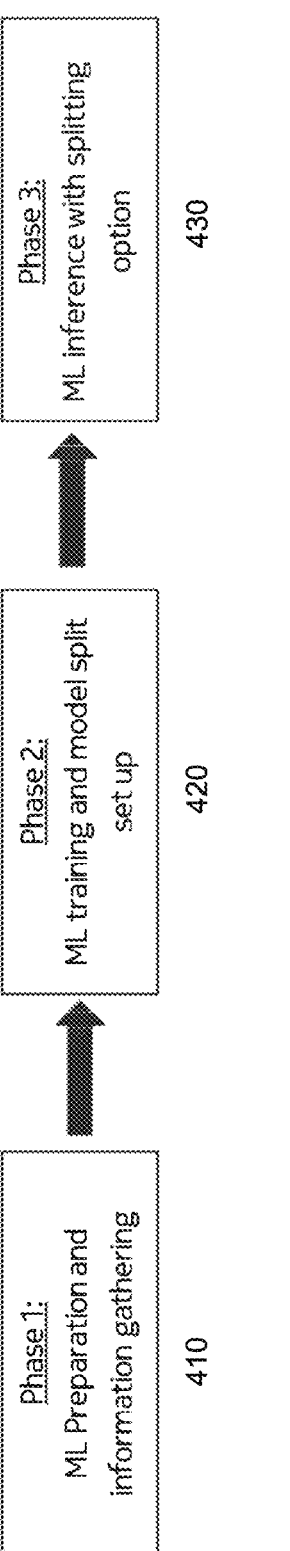
FIG. 4 is a diagram illustrating features as described herein.

Referring now to FIG. 4, illustrated is an example of phases of example embodiments of the present disclosure. In a first phase of ML model distribution (410), ML model preparation and information gathering may be performed. In an example embodiment, a machine learning model, including the hyperparameters (e.g. a neural network), may be selected. In an example embodiment, ML preparation and information gathering may be performed at the network level (such as gNB, NWDAF or O-RAN). At this level, the network may need to collect additional information about UEs such as battery status, power saving mode, memory status, UE type, etc. For example, a battery status may be a percentage of battery life/power that remains (e.g. 100%, 50%, 10%, etc.), or whether or not the UE is connected to power (e.g. a non-decreasing remaining battery status may be observed). For example, a power saving mode may be whether or not the UE can activate a power saving model to preserve the battery. For example, a memory status may be an amount of available memory (e.g. as a percentage or value in MB, KB, GB, etc.). For example, a UE type may RedCap UE, IAB MT, etc. Additional information about the UE may also include a ML processing capability of the UE (e.g., what type of NN the UE is configured to enable). During this phase, the network may identify the ML model needs in terms of labelled data for realizing ML model training to enable rogue BS detection, and may collect such data (e.g. with measurement requests towards the active UEs). The labelled data may include SINR measurements made by a UE. For example, the labelled data may be SINR measures performed by the UE on a PCi before and after a handover failure (data) and the knowledge that the PCi is a regular BS or a rogue BS (label). The knowledge that the PCi is a regular or Rogue BS may not be information coming from the UE(s), but known by other means, as described below.

In a second phase of ML model distribution (420), ML training and model split may be set up. During this phase, the selected ML model may be trained using the selected ML architecture in phase 1, as well as the prepared labelled dataset. Thereafter, based on the received UE information, the network may analyze and group the different device capabilities and then perform the different ML model splits accordingly. Finally, the different split ML models may be transmitted with ML partitions tailored to each UE.

In a third phase of ML distribution (430), ML inference with splitting option may be performed. The detection of rogue base station(s) may be performed with ML inference. Parts of the detection procedure may be distributed over the different UEs, and the outputs/results may be combined at the network level.

In an example embodiment, an unusual rate of handover failure for some physical cell ID (PCI) may be detected at the network level. The network may gather a list of PCIs of all active cells at the time of such handover failure(s). The network may then send a notification to all UEs that report reference signal received power (RSRP) of PCI corresponding to the gathered list, alerting them of the suspected PCI and asking them to record constantly/consecutively 'n' seconds of signal to interference plus noise ratio (SINR) values at the cell phone (i.e. UE) level. In the case of a handover failure towards the suspected PCI, a trained neural network (e.g. with part at the UE and part at the network) may qualify the handover failure as 'normal' or 'due to a false base station'. Alternatively, if the UE has limited capabilities, only a part of the neural network may be triggered.

The training part of the neural network (e.g. 420) may be done during special training sessions, with operator managed "rogue" base stations and special devices, or using common devices using new signaling messages. Additionally or alternatively, the training may be performed based on historical data, for example where a rogue base station was (correctly) detected, but detected late. The training part may be followed by a phase in which the different possible splits of the neural network may be computed (420).

In the case of a false base station detection, the UE (e.g. a trusted part of the UE) may send a notification to the network containing, at least, the timestamp of handover failure and the PCI of the base station the handover was about/concerning. The message may be authenticated to avoid an attacker reporting incorrect false base station detection events in order to provoke a denial of service (DoS).

In an example embodiment, the network may correlate all detection reports in order to diagnose the presence of a false base station impersonating a genuine PCI (430).

Figure 5:
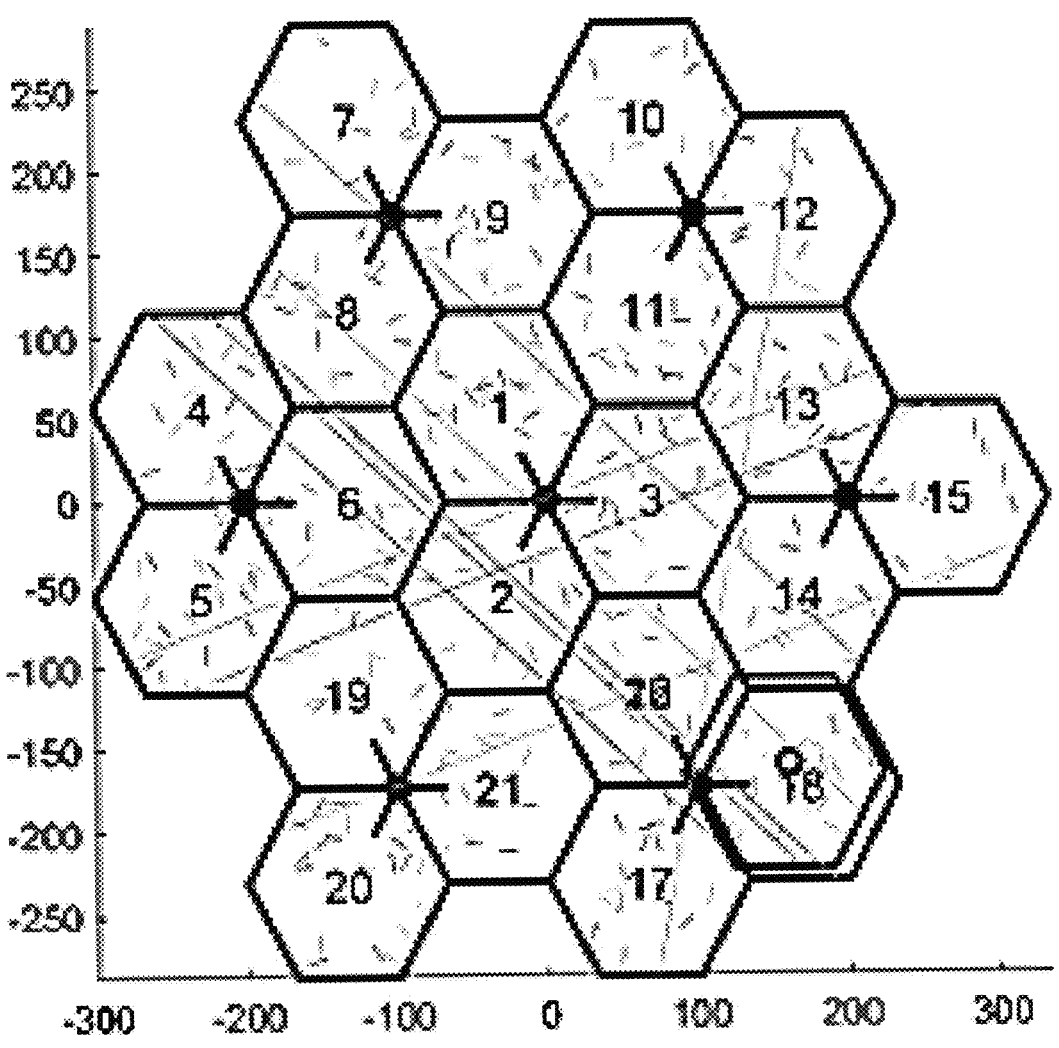
FIG. 5 is a graph illustrating features as described herein.

In an example embodiment, a machine learning method may be used for fake BS detection. Referring now to FIG. 5, illustrated is an assessment of performance of example embodiments of the present disclosure. The assessment was performed using an internal system level simulator SON-Tool composed of 22 cells, 1 fake station (at fixed location), and 420 UEs. The collected dataset consists of: 438 handover events, including 261 caused by a false base station; and radio measurements collected at 10 ms periodicity (e.g. SINR, RSRP). This dataset was split into 2 parts, a training dataset which represents 80% of the whole dataset, and the test dataset (i.e. the rest).

Figure 6:
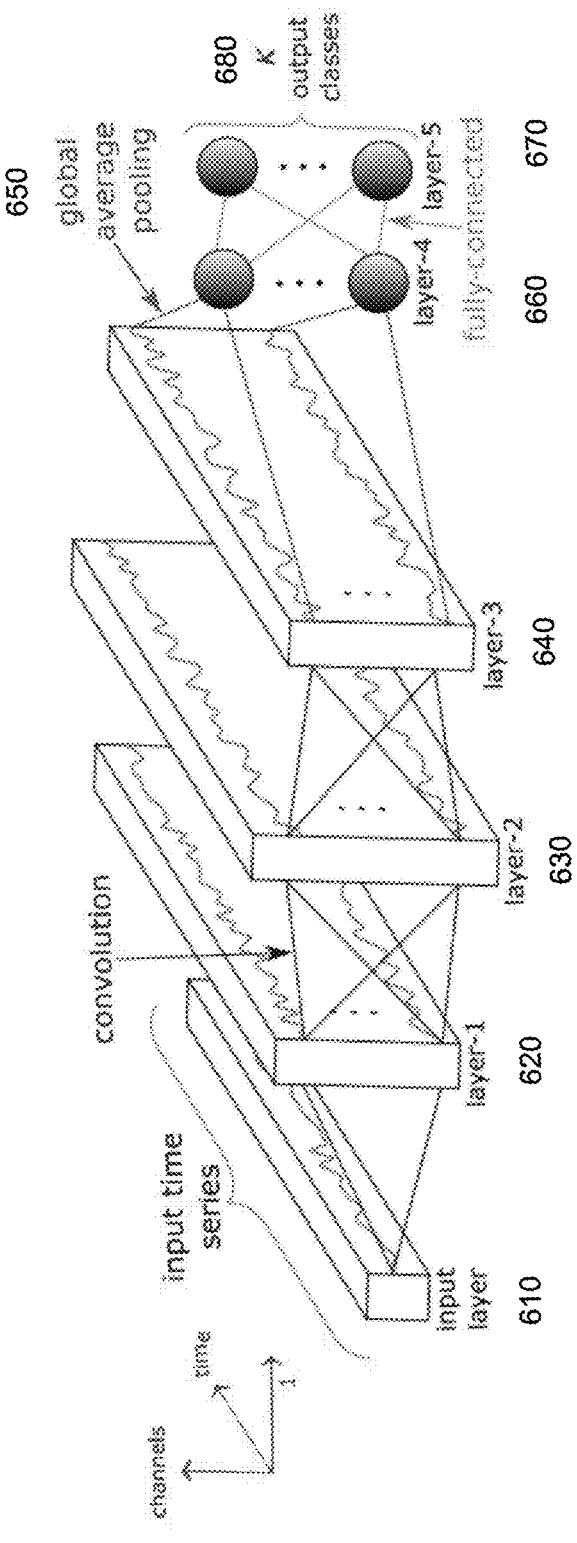
FIG. 6 is a diagram illustrating features as described herein.
Figure 7:
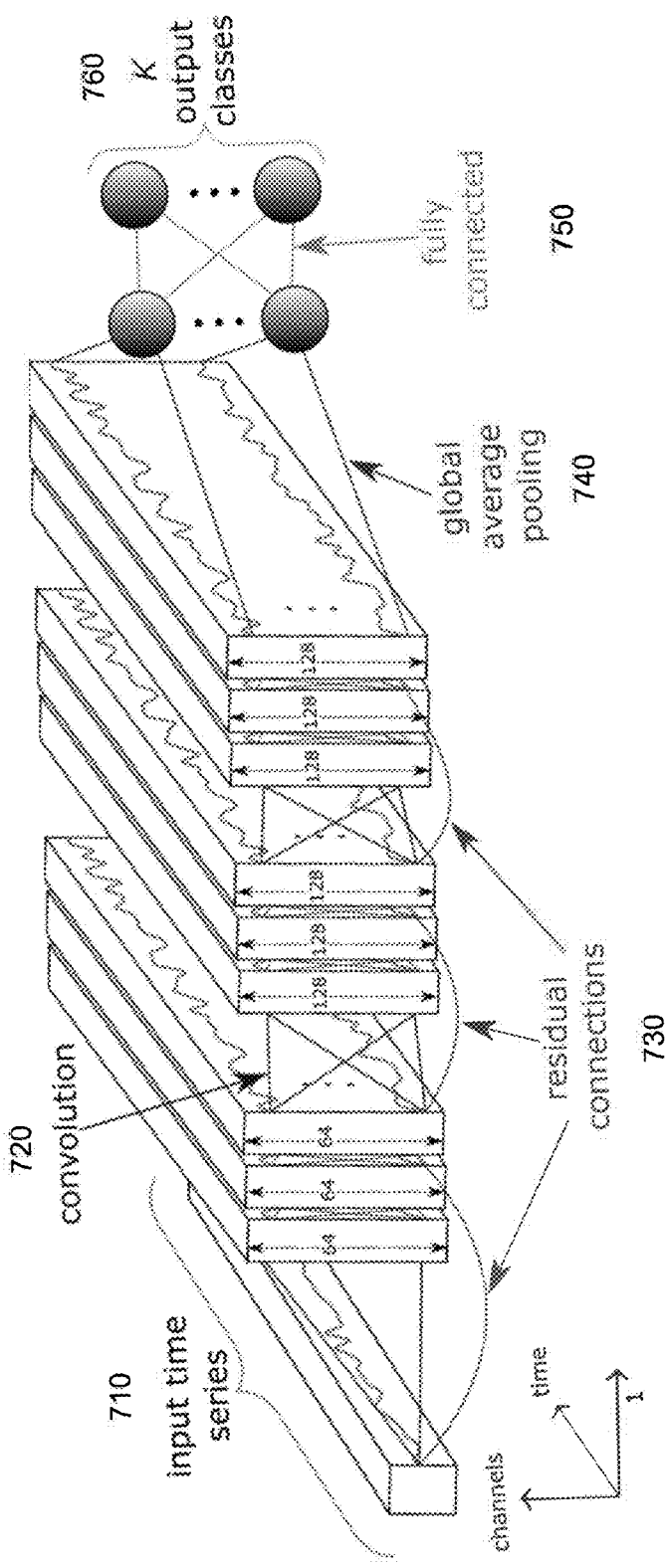
FIG. 7 is a diagram illustrating features as described herein.

Two neural network architectures were used for the evaluation of FIG. 5: a fully connected network, for example as depicted in FIG. 6 and a residual neural network (resnet) network, for example as depicted in FIG. 7. The fully connected architecture illustrated in FIG. 6 comprises an input layer (610), three convolutionally connected layers (620, 630, 640), global average pooling (650), and fully connected layers (660, 670), which output K output classes (680). The resnet architecture illustrated in FIG. 7 comprises an input layer (710), convolutionally connected layers (720), some of which are residually connected to other layers (730), global average pooling (740), and fully connected layers (750), which output K output classes (760).

As input of the neural network, a SINR time series (centered around handover time occurrence) was considered. As output, the classification as follows was considered: Class 0: when the target base station is not false (i.e. is genuine); Class 1: when the target base station is false.

Figure 8:
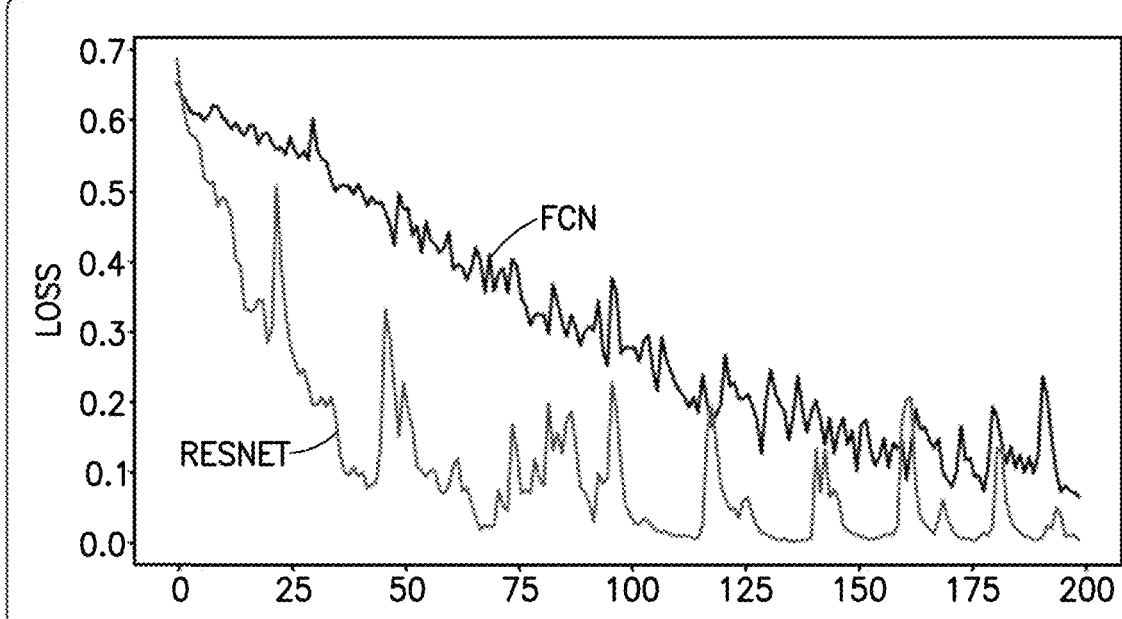
FIG. 8 is a graph illustrating features as described herein.
Figure 8:
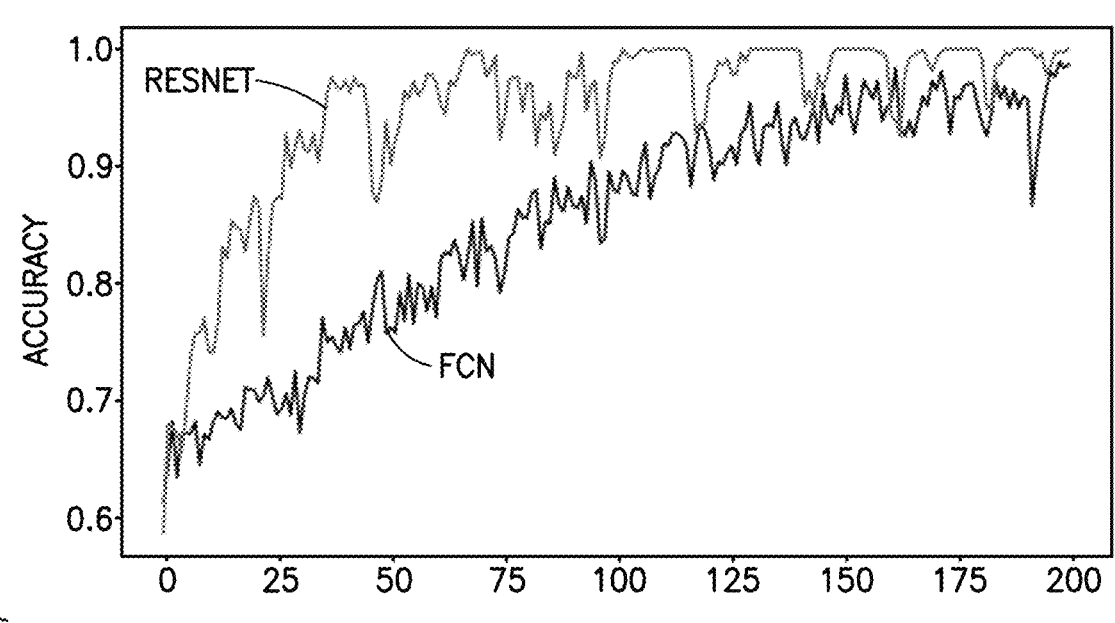

Referring now to FIG. 8, illustrated is a comparison of the fully connected architecture and the resnet architecture with respect to accuracy and loss. Obtained results show that the resnet architecture provides better results compared to the fully connected architecture. In addition, for the resnet architecture, the convergence speed is higher than for the fully connected architecture. This may be explained by the fact that the local correlation of the time series, in this case, is very important, as when handling an image. Therefore, a convolutional neural network may be considered more suitable.

Figure 9:
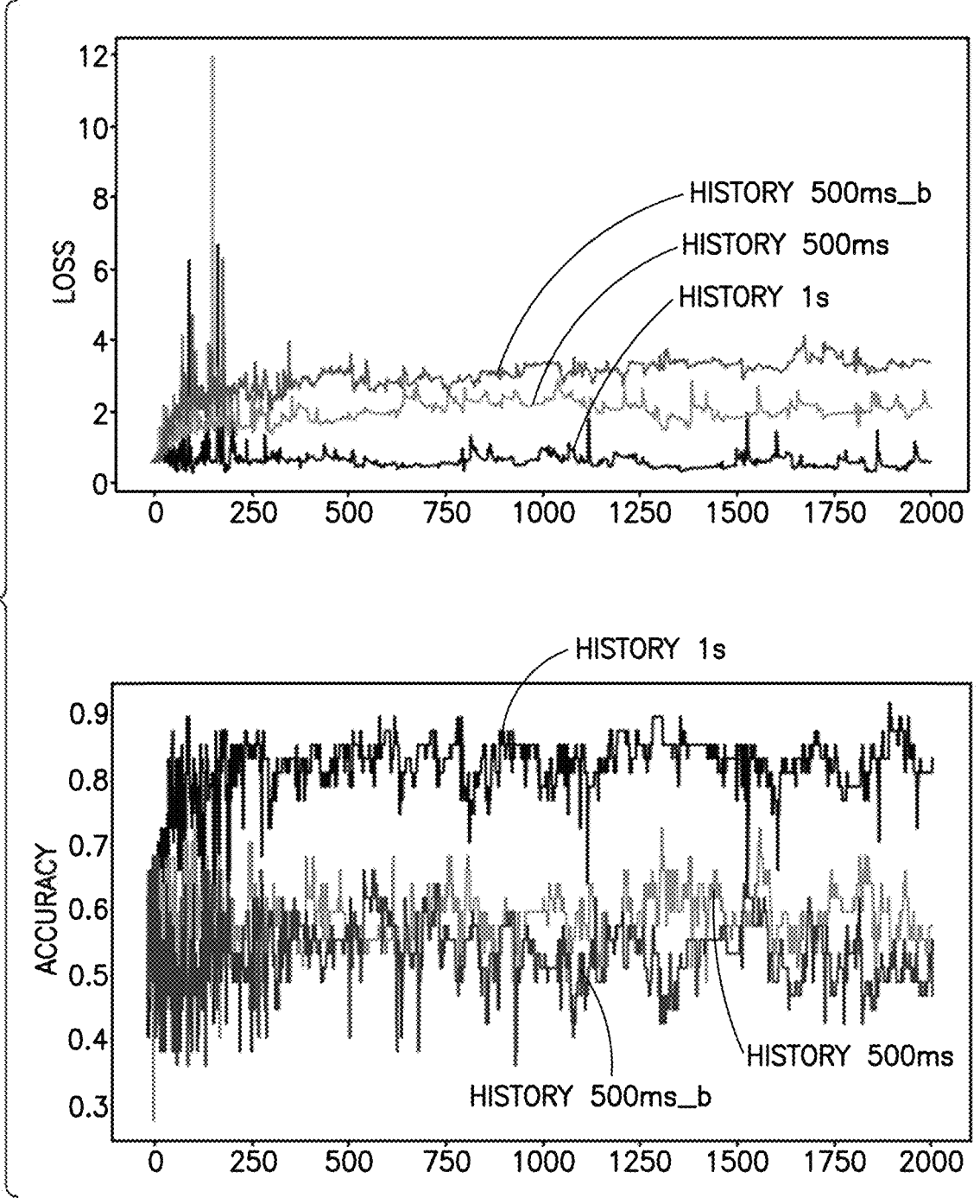
FIG. 9 is a graph illustrating features as described herein.

Referring now to FIG. 9, illustrated are various metrics in order to identify the best setup between taking only time series before the located handover; or taking, in addition to the time series before, the time series after. The results show that it may be preferable to take time series centered at the located handover. When the same number of points before the located handover are added to the points after the located handover, an accuracy of 0.9 may result.

Figure 10:
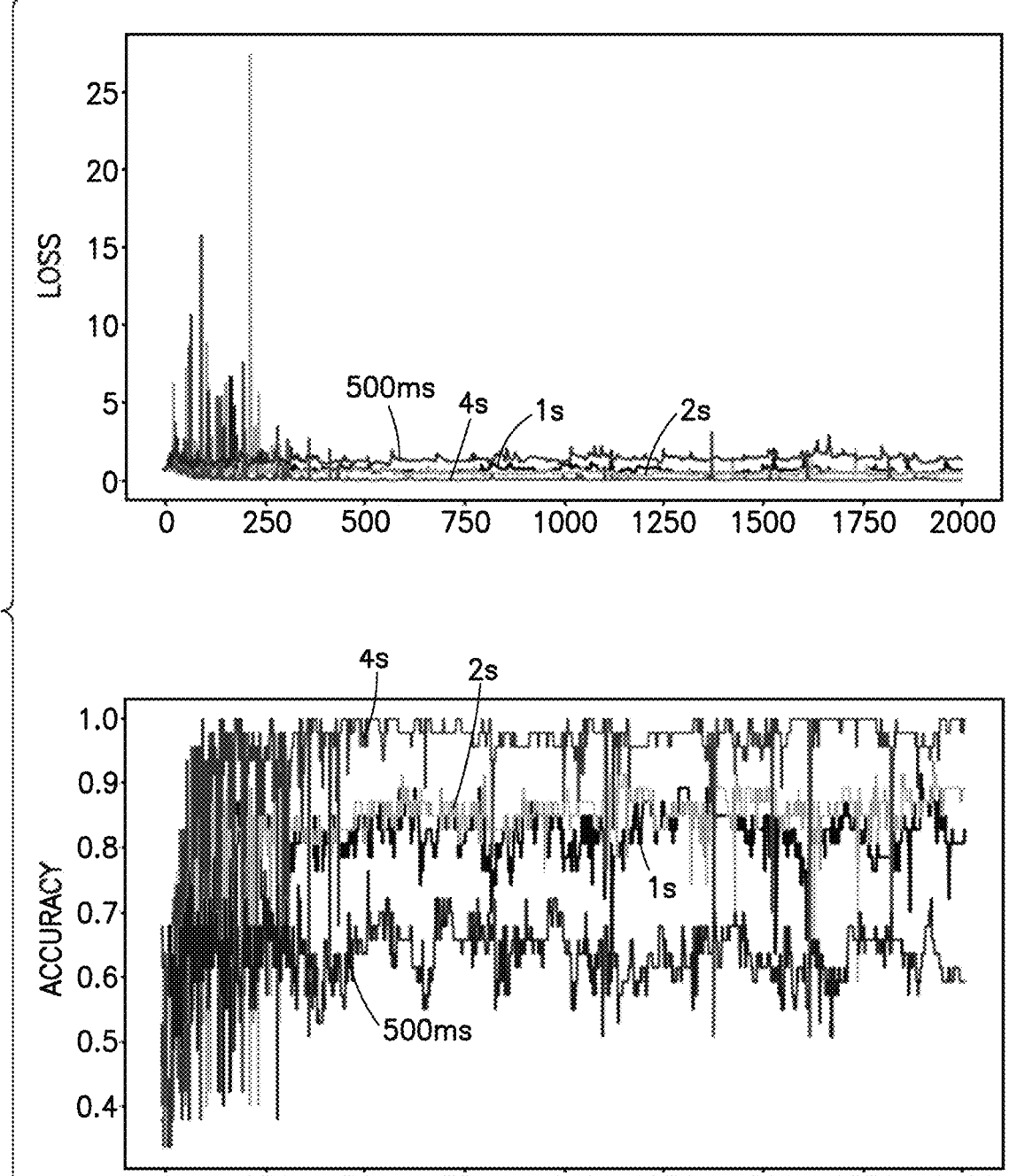
FIG. 10 is a graph illustrating features as described herein.

Referring now to FIG. 10, illustrated is a comparison of different time series sizes from 500 ms to 4 s. It may be noted that, using a time series of 4 s, an accuracy of almost 1 may be reached. The recall and precision may also reach almost 1.

There are several levers that may be used to improve performance. For instance, as we have seen before, the time windows and the position of the located handover may help to get better accuracy. In addition to that, the frequency of SINR may be used to improve both the training/inference duration and the accuracy.

Figure 11:
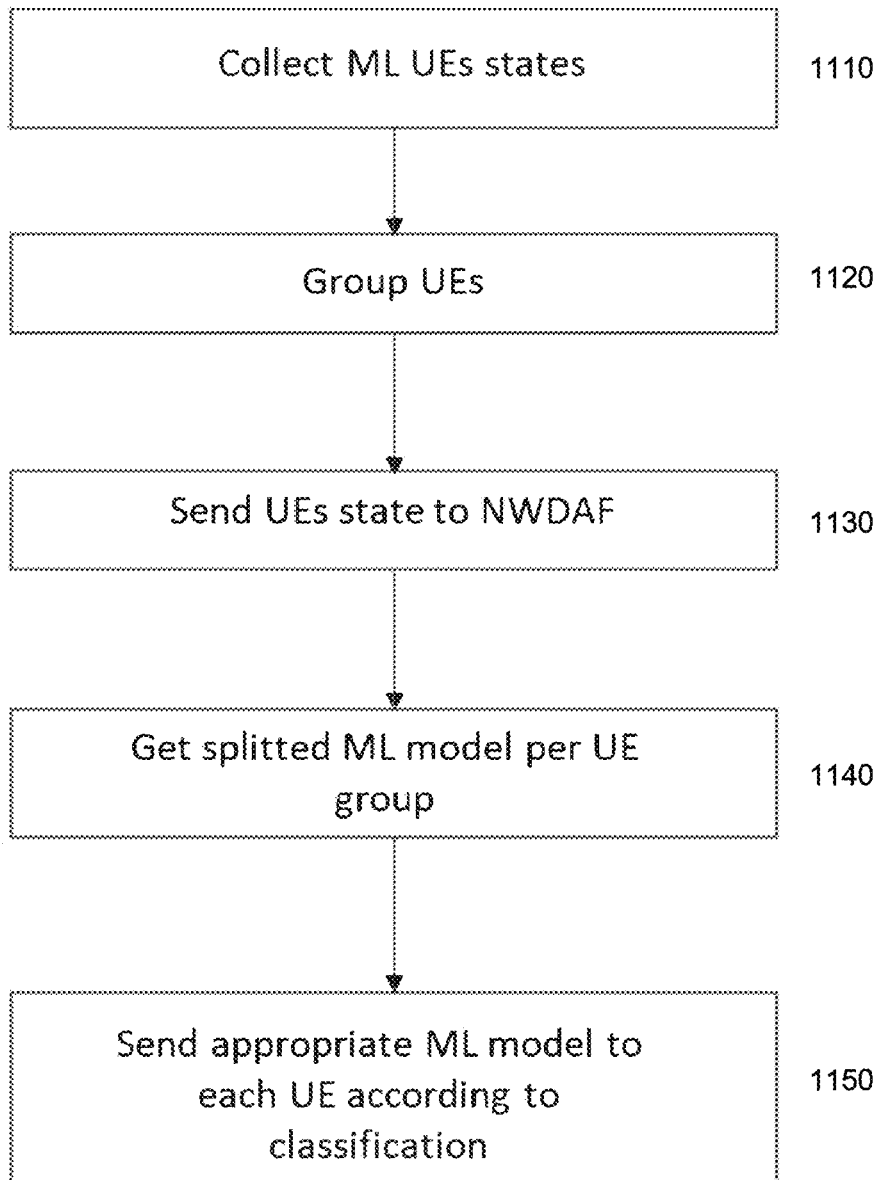
FIG. 11 is a flowchart illustrating steps as described herein.

In an example embodiment, ML splitting may be optimized as a function of UE capabilities. In an example embodiment, in order to prepare the ML model splitting, it may be necessary to regroup the different UEs capabilities. FIG. 11 illustrates the different steps for UE group management for optimized ML model splitting and distribution according to an example embodiment of the present disclosure. At 1110, ML UE states may be collected (e.g. ML UE capabilities: battery status, power saving mode, memory status, UE type, etc.). At 1120, the UEs may be grouped. At 1130, the UE states may be sent to NWDAF. At 1140, the split ML model, per UE group, may be determined. The split ML models may be overlapping or non-overlapping. For example, a first split of an ML model may be determined for a first UE group, and a second split of an ML model may be determined for a second UE group, where the first split and the second split may be the same, different, or at least partially different. An example of a split ML model may be a number of CNN layers. At 1150, each UE may receive the appropriate ML model (e.g. ML model split or the whole model) according to the classification of the UE.

Figure 12:
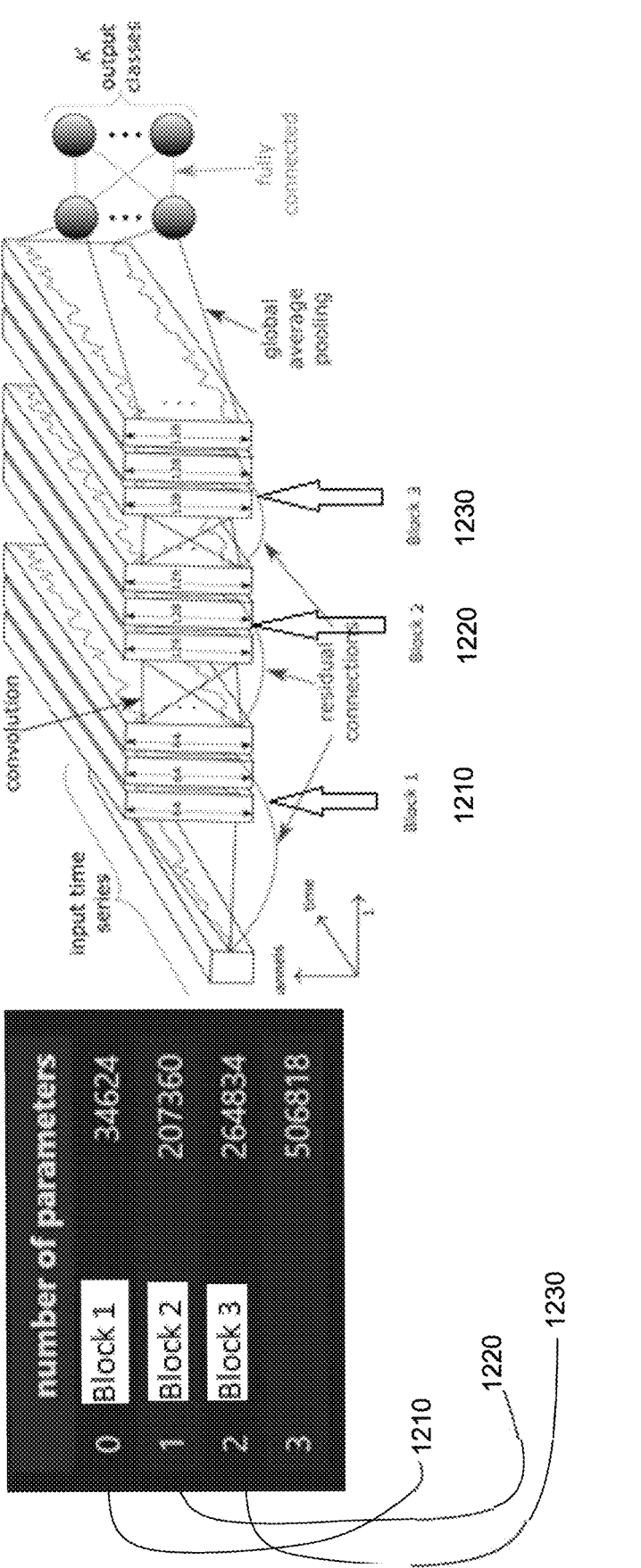
FIG. 12 is a diagram illustrating features as described herein.

Referring now to FIG. 12, illustrated is an example of resnet architecture. The number of parameters in each block may be associated with a number of parameters in the architecture (e.g. number of hidden nodes, number of hidden layers, input layers, output layers, elements/nodes/neurons of the ML model, etc.). In the example of FIG. 12, the time series size may comprise 200 elements (e.g. the time window may be 2 s, with a frequency of measurement of 100 hertz, meaning one measurement every 10 millisecond, which means a time series size of 2×100=200 elements). For example, block 1 (1210) may be associated with 34624 parameters; block 2 (1220) may be associated with 207360 parameters; and block 3 (1230) may be associated with 264834 parameters. Given this architecture, 3 split configurations may be created/determined, as illustrated in TABLE 1:

TABLE 1

| | ML inference step 1 at UE | ML inference step 2 at NWDAF | Split criteria |
|---|---|---|---|
| Split option 1 | Block 1: 34624 | Block 2 + Block 3: 472194 | For limited UE (CPU power, battery) |
| Split option 2 | Block 1 + Block 2: 241 984 | Block 3: 264 834 | For average UE |
| Split option 2 | Block 1 + Block 2 + Block 3: 506818 | 0 | For performant UE (smartphone for instance) |

In an example, a UE may be categorized as a limited UE (e.g. having a first combination of capabilities), an average UE (e.g. having a second combination of capabilities, greater than the first combination), or a performant UE (e.g. having a third combination of capabilities, greater than the first combination and the second combination). Based on the categorization of the UE, the UE may be assigned a corresponding partition of the ML model.

Figure 13:
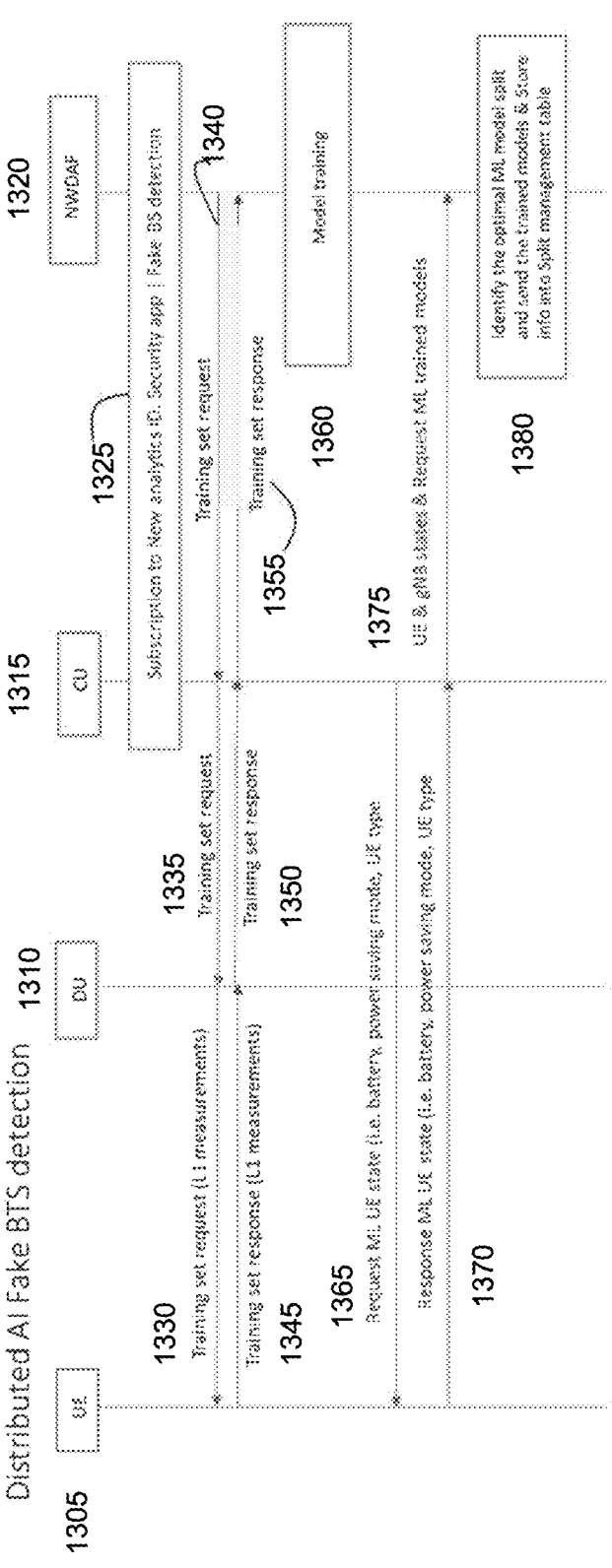
FIG. 13 is a flowchart illustrating steps as described herein.
Figure 14:
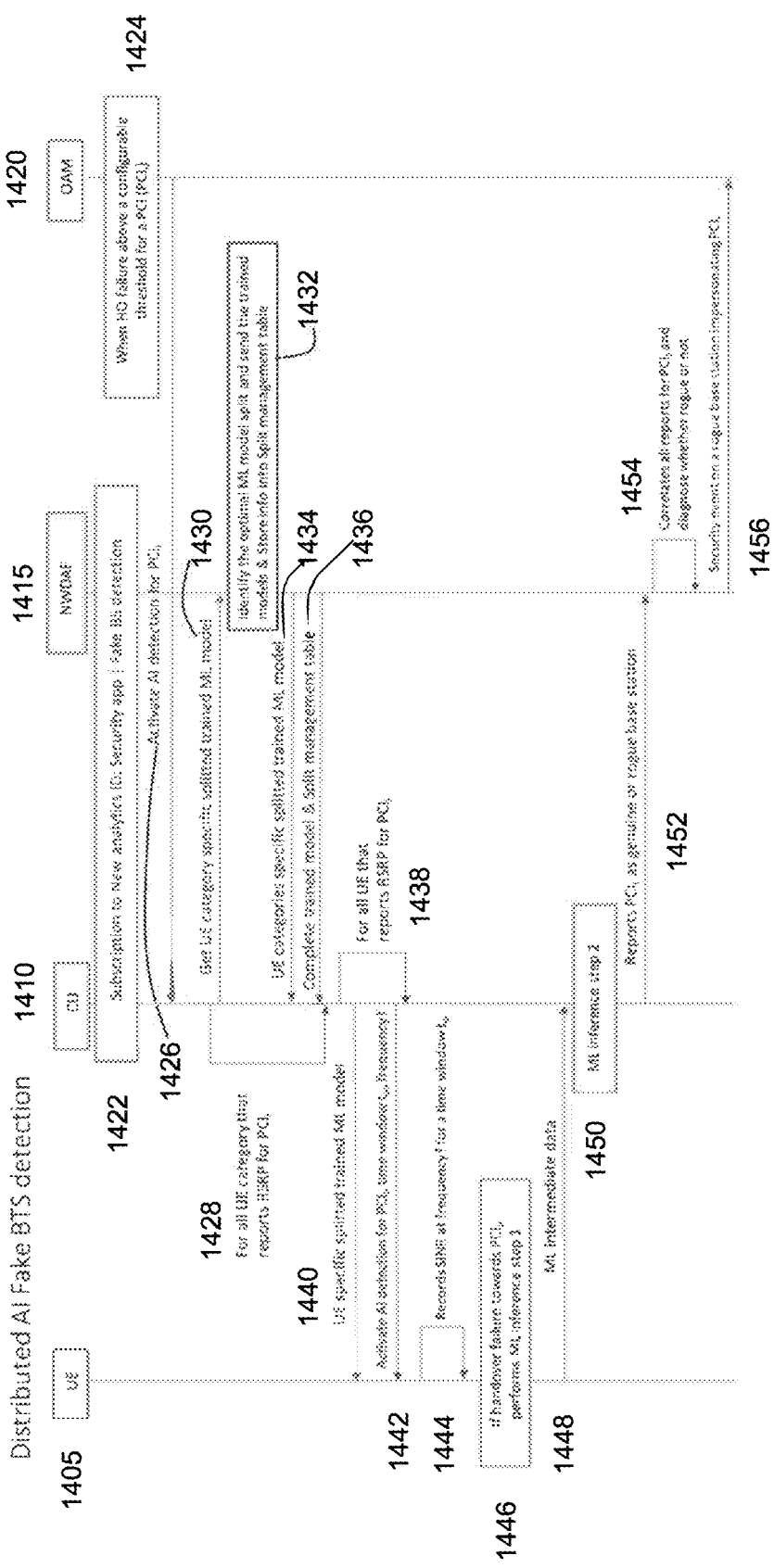
FIG. 14 is a flowchart illustrating steps as described herein.

In an example embodiment, new signaling may be required to enable the use of ML splitting with NWDAF. FIGS. 13 and 14 detail different steps and signaling exchanges according to example embodiments of the present disclosure. A technical effect of example embodiments of the present disclosure may be to enable detection of distributed fake/rogue base station(s). FIG. 13 details the different steps for the learning/training phase of the proposed solution, while FIG. 14 details the different steps for the inference phase.

Referring now to FIG. 13, illustrated is the case where the NWDAF entity (1320) is used in order to realize the ML model training. Note that realizing the ML model training in NWDAF is just an example and other entities can be used for training also, e.g., the Management Data Analytics Function (MDAF) in OAM. To this end, it may be necessary to introduce a new analytics ID, which may be referred to as Security app|Fake BS detection, and subscribe to it. Currently, this analytics ID is not part of the standard specification. At 1325, the CU (1315) and the NWDAF (1320) may perform subscription to the new analytics ID.

In an example embodiment, an ML model may use L1 measurements, which may usually be available at UE level but not reported. In an example embodiment, for training purposes, the UE may request these L1 measurements. The NWDAF (1320) and the CU (1315) may request these L1 measurements through a CU request (1340, 1335) transmitted towards relative DU (1310). The training set request may be configured to enable receipt of requested L1 measurements and corresponding labels, for example, presence or absence of a fake base station. The DU (1310) may forward the training set request (1330) to the UE (1305). The UE (1305) may transmit, to the DU (1310), a training set response, which may include the L1 measurements (1345). The DU (1310) may forward the training set response (1350) to the CU (1315), which may forward the training set response (1355) to the NWDAF (1320). Using the gathered set of labelled data, the NWDAF (1320) may train its ML model (1360).

At 1365, the CU (1315) may request UEs (e.g. UE 1305) to send their capabilities (e.g. ML UE state, battery level, power saving model, memory size, and/or UE type). At 1370, the UE (1305) may transmit, in response, collected information about capabilities. In an example embodiment, the UE (1305) may also transmit indication(s) of gNB capabilities (e.g. with similar information as transmitted for the UE) to the NWDAF (1320). The CU (1315) may receive the response from the UE (1305), and may transmit, to the NWDAF (1320) the UE and gNB states and a request for ML trained models (1375). At 1380, the NWDAF (1320) may analyze the gNB and UEs capabilities, and may identify the required ML model splits, since different ML partitions may be realized to be tailored to the diverse UE capabilities. A split management table may be identified at the NWDAF level; the different identified ML model splits parameters may be stored in the split management table.

Referring now to FIG. 14, illustrated are different steps and signaling exchanges for activating fake base station detection method(s) in operation. In the example of FIG. 14, it may be assumed that the learning/training phase seen in FIG. 13 has been successfully accomplished. During the learning phase, the optimal frequency, time window ($t_w$) size and handover failure position in the time window may have been determined. Accordingly, there may be two sub-time windows: the first one is the time window ($t_w1$) before the handover failure event, the other one is the time window ($t_w2$) after this event. We may have the relation: $t_w=t_w1+t_w2$.

At 1422, the CU (1410) and NWDAF (1415) may perform subscription to a new analytics ID according to an example embodiment of the present disclosure. Same as for FIG. 13, reference to NWDAF is exemplary and the same flows would be applicable for other Analytics Functions (e.g., for MDAF in OAM).

In an example embodiment, fake base station detection may be activated per PCI in a certain region. In other words, fake base station detection may be performed in a manner that is specific to a PCI and specific to a region. Any operations, administration, and maintenance (OAM) function may trigger fake base station detection according to an example embodiment of the present disclosure, for example whenever the situation requires the detection of a rogue base station (e.g. when the rate of HandOver failures toward a given PCI is growing and/or overreaching a configurable threshold). At 1424, the OAM function may determine that HO failure is above a configurable threshold for a PCI (PCI$_i$). In response, the OAM function may send a request to all CUs (e.g. CU 1410) reporting a handover failure towards the given PCI (PCI$_i$) (1426).

At 1430, each CU may request the specific splitted trained ML model from the NWDAF (1415) for each UE profile that reported RSRP for the specific PCI. This may be performed for all UE categories for reported RSRP for PCI$_i$ (1428). At 1432, the NWDAF (1415) may identify the optimal ML model split, send the trained models to the CU (1410), and store information into a split management table. At 1434, the NWDAF (1415) may transmit, to the CU (1410), the UE categories specific splitted trained ML model. In other words, for each UE profile, the NWDAF (1415) may send the different ML partitions to the CU. The complete trained ML model as well as the split management table (1436) may be sent to the CU (1410).

For each UE reporting the specific PCI (1438), the CU (1410) may send the UE specific splitted trained ML model (1440), and may activate the AI detection given the hyperparameters found in the split management table (e.g. time window, frequency, etc.) (1442).

At this stage, all ML components may be ready to be used for inference to detect the presence of fake base station(s). The ML partition at the UE side (e.g. 1405) may run on L1 measurements. For example, upon reception of the activation (1442) from the CU (1410), each UE (e.g. 1405) may start computing and recording the SINR at frequency f for a time window $t_w$ (1440). On reception of the activation (1442) for the CU(1410), all UEs may start computing and recording of the SINR at frequency f for a time window $t_w1$. At 1446, if handover failure towards the specific PCI$_i$ is detected/experienced, the UE (1405) may record the SINR for the specified time window with the specified frequency (e.g. the time window and frequency determined during the learning/training phase) and perform the ML inference. If handover failure towards the specific PCI$_i$ is detected/experienced, the UE may compute and record the SINR for an additional $t_w2$ time and perform the ML inference part of the split that have been delegated to it with, as entry data, all SINR recorded during $t_w1+t_w2$. In other words, the UE (1405) may perform ML inference step 1. At 1448, the output (ML intermediate data, 1448 may be sent to the CU (1410) to complete the ML inference and detect possible presence of attacker. On reception of UE intermediate data, the CU (1410) may perform the remaining ML inference, for example ML inference step 2 (1450). At 1452, the result of the global inference may be sent to the NWDAF (1415), which may collect all reports for targeted PCIs.

At 1454, the diagnosis may be performed by correlating all received reports. If the PCI is diagnosed to be a rogue base station, at 1456 the NWDAF (1415) may send a notification to the OAM function (1420).

A technical effect of example embodiments of the present disclosure may be to detect a rogue base station that impersonates genuine base stations using normal power radio signals.

A technical effect of example embodiments of the present disclosure may be to avoid implementation of a heavy public key infrastructure.

A technical effect of example embodiments of the present disclosure may be to avoid impacting today's handover signaling procedures requiring new round of measurements. A technical effect of example embodiments of the present disclosure may be to provide a method that is more light-weight and independent of today's signaling procedures.

A technical effect of example embodiments of the present disclosure may be to enable rogue base station detection even if the rogue base station is at most at one hop of the impersonated base station.

A technical effect of example embodiments of the present disclosure may be to avoid a need for the precise location of the UE and the position and beam distribution details from the network.

A technical effect of example embodiments of the present disclosure may be to provide compatibility with low capacity UEs by the use of the neural network split. The recording of the SINR may be on demand and not a permanent feature, which may have the technical effect of preventing a drain of the UE battery.

FIG. 15 illustrates the potential steps of an example method 1500. The example method 1500 may include: determining that a first cell is experiencing a rate of handover failure at or above a first threshold, 1510; determining a list of physical cell identifiers of cells serving at a time of the first cell experiencing the rate of handover failure at or above the first threshold, wherein the list of physical cell identifiers comprises, at least, a physical cell identifier associated with the first cell, 1520; obtaining information related to a plurality of user equipments, wherein respective ones of the plurality of user equipments have reported a reference signal received power measurement associated with at least one physical cell identifier of the determined list of physical cell identifiers, 1530; categorizing the plurality of user equipments into one or more groups of user equipments based, at least partially, on the obtained information, 1540; obtaining an indication of partitions of a machine learning model corresponding to respective ones of the one or more groups, 1550; transmitting, to the respective ones of the plurality of user equipments, a corresponding partition, of the partitions of the machine learning model, based, at least partially, on the one or more groups of the plurality of user equipments, 1560; transmitting, to the plurality of user equipments, an indication to record measurements for the first cell with a configured frequency for a configured time period, 1570; receiving, from at least one of the plurality of user equipments, at least one message regarding a handover failure, wherein the at least one message comprises a message generated using a first partition of the partitions of the machine learning model, 1580; and determining, with a second partition of the partitions of the machine learning model, whether the first cell is a rogue base station based, at least partially, on a plurality of detection reports, wherein the plurality of detection reports comprises, at least, the at least one received message, 1590. The example method 1500 may be performed, for example, by a network node, a CU, a DU, a NWDAF, a MDAF, some combination of the forgoing, etc.

FIG. 16 illustrates the potential steps of an example method 1600. The example method 1600 may include: receiving a request for information associated with the apparatus, 1610; transmitting the requested information, 1620; receiving, in response to the requested information, a partition of a machine learning model, 1630; receiving an indication to record measurements for a first cell with a configured frequency for a configured time period, 1640; recording the measurements for the first cell with the configured frequency for the configured time period, 1650; detecting a handover failure towards the first cell, 1660; analyzing the recorded measurements during a first time period before the handover failure and during a second time period after the handover failure using the partition of the machine learning model, 1670; and transmitting a result of the analysis of the recorded measurements, 1680. The example method 1600 may be performed, for example, by a UE.

In accordance with one example embodiment, an apparatus may comprise: at least one processor; and at least one memory storing instructions that, when executed by the at least one processor, cause the apparatus at least to: determine that a first cell is experiencing a rate of handover failure at or above a first threshold; determine a list of physical cell identifiers of cells active at a time of the first cell experiencing the rate of handover failure at or above the first threshold, wherein the list of physical cell identifiers may comprise, at least, a physical cell identifier associated with the first cell; obtain information related to a plurality of user equipments, wherein respective ones of the plurality of user equipments may have reported a reference signal received power measurement associated with at least one physical cell identifier of the determined list of physical cell identifiers; categorize the plurality of user equipments into one or more groups of user equipments based, at least partially, on the obtained information; obtain an indication of partitions of a machine learning model corresponding to respective ones of the one or more groups; transmit, to the respective ones of the plurality of user equipments, a corresponding partition, of the partitions of the machine learning model, based, at least partially, on the one or more groups of the plurality of user equipments; transmit, to the plurality of user equipments, an indication to record measurements for the first cell with a configured frequency for a configured time period; receive, from at least one of the plurality of user equipments, at least one message regarding a handover failure, wherein the at least one message may comprise a message generated using a first partition of the partitions of the machine learning model; and determine, with a second partition of the partitions of the machine learning model, whether the first cell is a rogue base station based, at least partially, on a plurality of detection reports, wherein the plurality of detection reports may comprise, at least, the at least one received message.

The obtained information may comprise at least one of: a battery status of a user equipment of the plurality of user equipments, a power saving mode of the user equipment, an amount of memory available for the user equipment, a type of the user equipment, a machine learning processing capability of the user equipment, or a processing capability of the user equipment.

The example apparatus may be further configured to: subscribe to an analytics identifier associated with rogue base station detection; request, from the plurality of user equipments, one or more L1 measurements that are respectively associated with rogue base station detection labels; and provide the one or more L1 measurements to a network data analytics function for training of the machine learning model.

The measurements may comprise one of: a signal to inference plus noise ratio, or a reference signal received power.

The example apparatus may be further configured to: perform authentication of the at least one received message.

The at least one message may comprise, at least, a time stamp and a physical cell identifier associated with the handover failure.

The first partition may be at least partially different from the second partition.

Obtaining the indication of the partitions of the machine learning model may comprise the example apparatus being further configured to: provide the information related to the plurality of user equipments, information associated with the one or more groups, and information associated with the apparatus to a network data analytics function; and receive, from the network data analytics function, the indication of the partitions of the machine learning model, and the machine learning model, wherein the indication of the partitions of the machine learning model may comprise a split management table.

Determining that the first cell is experiencing the rate of handover failure at or above the first threshold may comprise the example apparatus being further configured to: receive, from an operations, administration, and maintenance function, a request to activate rogue base station detection with respect to the first cell.

The indication to record measurements for the first cell with the configured frequency for the configured time period may comprise an indication to record at least one measurement during a first time period prior to the handover failure and to record at least one measurement during a second time period after the handover failure.

In accordance with one aspect, an example method may be provided comprising: determining, with a first user equipment, that a first cell is experiencing a rate of handover failure at or above a first threshold; determining a list of physical cell identifiers of cells serving at a time of the first cell experiencing the rate of handover failure at or above the first threshold, wherein the list of physical cell identifiers may comprise, at least, a physical cell identifier associated with the first cell; obtaining information related to a plurality of user equipments, wherein respective ones of the plurality of user equipments may have reported a reference signal received power measurement associated with at least one physical cell identifier of the determined list of physical cell identifiers; categorizing the plurality of user equipments into one or more groups of user equipments based, at least partially, on the obtained information; obtaining an indication of partitions of a machine learning model corresponding to respective ones of the one or more groups; transmitting, to the respective ones of the plurality of user equipments, a corresponding partition, of the partitions of the machine learning model, based, at least partially, on the one or more groups of the plurality of user equipments; transmitting, to the plurality of user equipments, an indication to record measurements for the first cell with a configured frequency for a configured time period; receiving, from at least one of the plurality of user equipments, at least one message regarding a handover failure, wherein the at least one message may comprise a message generated using a first partition of the partitions of the machine learning model; and determining, with a second partition of the partitions of the machine learning model, whether the first cell is a rogue base station based, at least partially, on a plurality of detection reports, wherein the plurality of detection reports may comprise, at least, the at least one received message.

The obtained information may comprise at least one of: a battery status of a user equipment of the plurality of user equipments, a power saving mode of the user equipment, an amount of memory available for the user equipment, a type of the user equipment, a machine learning processing capability of the user equipment, or a processing capability of the user equipment.

The example method may further comprise: subscribing to an analytics identifier associated with rogue base station detection; requesting, from the plurality of user equipments, one or more L1 measurements that are respectively associated with rogue base station detection labels; and providing the one or more L1 measurements to a network data analytics function for training of the machine learning model.

The measurements may comprise one of: a signal to inference plus noise ratio, or a reference signal received power.

The example method may further comprise: performing authentication of the at least one received message.

The at least one message may comprise, at least, a time stamp and a physical cell identifier associated with the handover failure.

The first partition may be at least partially different from the second partition.

The obtaining of the indication of the partitions of the machine learning model may comprise: providing the information related to the plurality of user equipments, information associated with the one or more groups, and information associated with the first user equipment to a network data analytics function; and receiving, from the network data analytics function, the indication of the partitions of the machine learning model, and the machine learning model, wherein the indication of the partitions of the machine learning model may comprise a split management table.

Determining that the first cell is experiencing the rate of handover failure at or above the first threshold may comprise: receiving, from an operations, administration, and maintenance function, a request to activate rogue base station detection with respect to the first cell.

The indication to record measurements for the first cell with the configured frequency for the configured time period may comprise an indication to record at least one measurement during a first time period prior to the handover failure and to record at least one measurement during a second time period after the handover failure.

In accordance with one example embodiment, an apparatus may comprise: circuitry configured to perform: determining that a first cell is experiencing a rate of handover failure at or above a first threshold; circuitry configured to perform: determining a list of physical cell identifiers of cells serving at a time of the first cell experiencing the rate of handover failure at or above the first threshold, wherein the list of physical cell identifiers may comprise, at least, a physical cell identifier associated with the first cell; circuitry configured to perform: obtaining information related to a plurality of user equipments, wherein respective ones of the plurality of user equipments may have reported a reference signal received power measurement associated with at least one physical cell identifier of the determined list of physical cell identifiers; circuitry configured to perform: categorizing the plurality of user equipments into one or more groups of user equipments based, at least partially, on the obtained information; circuitry configured to perform: obtaining an indication of partitions of a machine learning model corresponding to respective ones of the one or more groups; circuitry configured to perform: transmitting, to the respective ones of the plurality of user equipments, a corresponding partition, of the partitions of the machine learning model, based, at least partially, on the one or more groups of the plurality of user equipments; circuitry configured to perform: transmitting, to the plurality of user equipments, an indication to record measurements for the first cell with a configured frequency for a configured time period; circuitry configured to perform: receiving, from at least one of the plurality of user equipments, at least one message regarding a handover failure, wherein the at least one message may comprise a message generated using a first partition of the partitions of the machine learning model; and circuitry configured to perform: determining, with a second partition of the partitions of the machine learning model, whether the first cell is a rogue base station based, at least partially, on a plurality of detection reports, wherein the plurality of detection reports may comprise, at least, the at least one received message.

In accordance with one example embodiment, an apparatus may comprise: processing circuitry; memory circuitry including computer program code, the memory circuitry and the computer program code configured to, with the processing circuitry, enable the apparatus to: determine that a first cell is experiencing a rate of handover failure at or above a first threshold; determine a list of physical cell identifiers of cells active at a time of the first cell experiencing the rate of handover failure at or above the first threshold, wherein the list of physical cell identifiers may comprise, at least, a physical cell identifier associated with the first cell; obtain information related to a plurality of user equipments, wherein respective ones of the plurality of user equipments may have reported a reference signal received power measurement associated with at least one physical cell identifier of the determined list of physical cell identifiers; categorize the plurality of user equipments into one or more groups of user equipments based, at least partially, on the obtained information; obtain an indication of partitions of a machine learning model corresponding to respective ones of the one or more groups; transmit, to the respective ones of the plurality of user equipments, a corresponding partition, of the partitions of the machine learning model, based, at least partially, on the one or more groups of the plurality of user equipments; transmit, to the plurality of user equipments, an indication to record measurements for the first cell with a configured frequency for a configured time period; receive, from at least one of the plurality of user equipments, at least one message regarding a handover failure, wherein the at least one message may comprise a message generated using a first partition of the partitions of the machine learning model; and determine, with a second partition of the partitions of the machine learning model, whether the first cell is a rogue base station based, at least partially, on a plurality of detection reports, wherein the plurality of detection reports may comprise, at least, the at least one received message.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: determining that a first cell is experiencing a rate of handover failure at or above a first threshold; determining a list of physical cell identifiers of cells serving at a time of the first cell experiencing the rate of handover failure at or above the first threshold, wherein the list of physical cell identifiers may comprise, at least, a physical cell identifier associated with the first cell; obtaining information related to a plurality of user equipments, wherein respective ones of the plurality of user equipments may have reported a reference signal received power measurement associated with at least one physical cell identifier of the determined list of physical cell identifiers; categorizing the plurality of user equipments into one or more groups of user equipments based, at least partially, on the obtained information; obtaining an indication of partitions of a machine learning model corresponding to respective ones of the one or more groups; transmitting, to the respective ones of the plurality of user equipments, a corresponding partition, of the partitions of the machine learning model, based, at least partially, on the one or more groups of the plurality of user equipments; transmitting, to the plurality of user equipments, an indication to record measurements for the first cell with a configured frequency for a configured time period; receiving, from at least one of the plurality of user equipments, at least one message regarding a handover failure, wherein the at least one message may comprise a message generated using a first partition of the partitions of the machine learning model; and determining, with a second partition of the partitions of the machine learning model, whether the first cell is a rogue base station based, at least partially, on a plurality of detection reports, wherein the plurality of detection reports may comprise, at least, the at least one received message.

The obtained information may comprise at least one of: a battery status of a user equipment of the plurality of user equipments, a power saving mode of the user equipment, an amount of memory available for the user equipment, a type of the user equipment, a machine learning processing capability of the user equipment, or a processing capability of the user equipment.

The means may be further configured to perform: subscribing to an analytics identifier associated with rogue base station detection; requesting, from the plurality of user equipments, one or more L1 measurements that are respectively associated with rogue base station detection labels; and providing the one or more L1 measurements to a network data analytics function for training of the machine learning model.

The measurements may comprise one of: a signal to inference plus noise ratio, or a reference signal received power.

The means may be further configured to perform: causing authentication of the at least one received message.

The at least one message may comprise, at least, a time stamp and a physical cell identifier associated with the handover failure.

The first partition may be at least partially different from the second partition.

The means configured to perform obtaining the indication of the partitions of the machine learning model may comprise means configured to perform: providing the information related to the plurality of user equipments, information associated with the one or more groups, and information associated with the apparatus to a network data analytics function; and receiving, from the network data analytics function, the indication of the partitions of the machine learning model, and the machine learning model, wherein the indication of the partitions of the machine learning model may comprise a split management table.

The means configured to perform determining that the first cell is experiencing the rate of handover failure at or above the first threshold may comprise means configured to perform: receiving, from an operations, administration, and maintenance function, a request to activate rogue base station detection with respect to the first cell.

The indication to record measurements for the first cell with the configured frequency for the configured time period may comprise an indication to record at least one measurement during a first time period prior to the handover failure and to record at least one measurement during a second time period after the handover failure.

A processor, memory, and/or example algorithms (which may be encoded as instructions, program, or code) may be provided as example means for providing or causing performance of operation.

In accordance with one example embodiment, a non-transitory computer-readable medium comprising instructions stored thereon which, when executed with at least one processor, cause the at least one processor to: determine that a first cell is experiencing a rate of handover failure at or above a first threshold; determine a list of physical cell identifiers of cells active at a time of the first cell experiencing the rate of handover failure at or above the first threshold, wherein the list of physical cell identifiers may comprise, at least, a physical cell identifier associated with the first cell; obtain information related to a plurality of user equipments, wherein respective ones of the plurality of user equipments may have reported a reference signal received power measurement associated with at least one physical cell identifier of the determined list of physical cell identifiers; categorize the plurality of user equipments into one or more groups of user equipments based, at least partially, on the obtained information; obtain an indication of partitions of a machine learning model corresponding to respective ones of the one or more groups; cause transmission, to the respective ones of the plurality of user equipments, of a corresponding partition, of the partitions of the machine learning model, based, at least partially, on the one or more groups of the plurality of user equipments; cause transmission, to the plurality of user equipments, of an indication to record measurements for the first cell with a configured frequency for a configured time period; cause reception, from at least one of the plurality of user equipments, of at least one message regarding a handover failure, wherein the at least one message may comprise a message generated using a first partition of the partitions of the machine learning model; and determine, with a second partition of the partitions of the machine learning model, whether the first cell is a rogue base station based, at least partially, on a plurality of detection reports, wherein the plurality of detection reports may comprise, at least, the at least one received message.

In accordance with one example embodiment, a non-transitory computer-readable medium comprising program instructions stored thereon for performing at least the following: determining that a first cell is experiencing a rate of handover failure at or above a first threshold; determining a list of physical cell identifiers of cells serving at a time of the first cell experiencing the rate of handover failure at or above the first threshold, wherein the list of physical cell identifiers may comprise, at least, a physical cell identifier associated with the first cell; obtaining information related to a plurality of user equipments, wherein respective ones of the plurality of user equipments may have reported a reference signal received power measurement associated with at least one physical cell identifier of the determined list of physical cell identifiers; categorizing the plurality of user equipments into one or more groups of user equipments based, at least partially, on the obtained information; obtaining an indication of partitions of a machine learning model corresponding to respective ones of the one or more groups; causing transmitting, to the respective ones of the plurality of user equipments, of a corresponding partition, of the partitions of the machine learning model, based, at least partially, on the one or more groups of the plurality of user equipments;

causing transmitting, to the plurality of user equipments, of an indication to record measurements for the first cell with a configured frequency for a configured time period; causing receiving, from at least one of the plurality of user equipments, of at least one message regarding a handover failure, wherein the at least one message may comprise a message generated using a first partition of the partitions of the machine learning model; and determining, with a second partition of the partitions of the machine learning model, whether the first cell is a rogue base station based, at least partially, on a plurality of detection reports, wherein the plurality of detection reports may comprise, at least, the at least one received message.

In accordance with another example embodiment, a non-transitory program storage device readable by a machine may be provided, tangibly embodying instructions executable by the machine for performing operations, the operations comprising: determining that a first cell is experiencing a rate of handover failure at or above a first threshold; determining a list of physical cell identifiers of cells serving at a time of the first cell experiencing the rate of handover failure at or above the first threshold, wherein the list of physical cell identifiers may comprise, at least, a physical cell identifier associated with the first cell; obtaining information related to a plurality of user equipments, wherein respective ones of the plurality of user equipments may have reported a reference signal received power measurement associated with at least one physical cell identifier of the determined list of physical cell identifiers; categorizing the plurality of user equipments into one or more groups of user equipments based, at least partially, on the obtained information; obtaining an indication of partitions of a machine learning model corresponding to respective ones of the one or more groups; causing transmitting, to the respective ones of the plurality of user equipments, of a corresponding partition, of the partitions of the machine learning model, based, at least partially, on the one or more groups of the plurality of user equipments; causing transmitting, to the plurality of user equipments, of an indication to record measurements for the first cell with a configured frequency for a configured time period; causing receiving, from at least one of the plurality of user equipments, of at least one message regarding a handover failure, wherein the at least one message may comprise a message generated using a first partition of the partitions of the machine learning model; and determining, with a second partition of the partitions of the machine learning model, whether the first cell is a rogue base station based, at least partially, on a plurality of detection reports, wherein the plurality of detection reports may comprise, at least, the at least one received message.

In accordance with another example embodiment, a non-transitory computer-readable medium comprising instructions that, when executed by an apparatus, cause the apparatus to perform at least the following: determining that a first cell is experiencing a rate of handover failure at or above a first threshold; determining a list of physical cell identifiers of cells serving at a time of the first cell experiencing the rate of handover failure at or above the first threshold, wherein the list of physical cell identifiers may comprise, at least, a physical cell identifier associated with the first cell; obtaining information related to a plurality of user equipments, wherein respective ones of the plurality of user equipments may have reported a reference signal received power measurement associated with at least one physical cell identifier of the determined list of physical cell identifiers; categorizing the plurality of user equipments into one or more groups of user equipments based, at least partially, on the obtained information; obtaining an indication of partitions of a machine learning model corresponding to respective ones of the one or more groups; causing transmitting, to the respective ones of the plurality of user equipments, of a corresponding partition, of the partitions of the machine learning model, based, at least partially, on the one or more groups of the plurality of user equipments; causing transmitting, to the plurality of user equipments, of an indication to record measurements for the first cell with a configured frequency for a configured time period; causing receiving, from at least one of the plurality of user equipments, of at least one message regarding a handover failure, wherein the at least one message may comprise a message generated using a first partition of the partitions of the machine learning model; and determining, with a second partition of the partitions of the machine learning model, whether the first cell is a rogue base station based, at least partially, on a plurality of detection reports, wherein the plurality of detection reports may comprise, at least, the at least one received message.

A computer implemented system comprising: at least one processor and at least one non-transitory memory storing instructions that, when executed by the at least one processor, cause the system at least to perform: determining that a first cell is experiencing a rate of handover failure at or above a first threshold; determining a list of physical cell identifiers of cells serving at a time of the first cell experiencing the rate of handover failure at or above the first threshold, wherein the list of physical cell identifiers may comprise, at least, a physical cell identifier associated with the first cell; obtaining information related to a plurality of user equipments, wherein respective ones of the plurality of user equipments may have reported a reference signal received power measurement associated with at least one physical cell identifier of the determined list of physical cell identifiers; categorizing the plurality of user equipments into one or more groups of user equipments based, at least partially, on the obtained information; obtaining an indication of partitions of a machine learning model corresponding to respective ones of the one or more groups; causing transmitting, to the respective ones of the plurality of user equipments, of a corresponding partition, of the partitions of the machine learning model, based, at least partially, on the one or more groups of the plurality of user equipments; causing transmitting, to the plurality of user equipments, of an indication to record measurements for the first cell with a configured frequency for a configured time period; causing receiving, from at least one of the plurality of user equipments, of at least one message regarding a handover failure, wherein the at least one message may comprise a message generated using a first partition of the partitions of the machine learning model; and determining, with a second partition of the partitions of the machine learning model, whether the first cell is a rogue base station based, at least partially, on a plurality of detection reports, wherein the plurality of detection reports may comprise, at least, the at least one received message.

A computer implemented system comprising: means for determining that a first cell is experiencing a rate of handover failure at or above a first threshold; means for determining a list of physical cell identifiers of cells serving at a time of the first cell experiencing the rate of handover failure at or above the first threshold, wherein the list of physical cell identifiers may comprise, at least, a physical cell identifier associated with the first cell; means for obtaining information related to a plurality of user equipments, wherein respective ones of the plurality of user equipments may have reported a reference signal received power measurement associated with at least one physical cell identifier of the determined list of physical cell identifiers; means for categorizing the plurality of user equipments into one or more groups of user equipments based, at least partially, on the obtained information; means for obtaining an indication of partitions of a machine learning model corresponding to respective ones of the one or more groups; means for causing transmitting, to the respective ones of the plurality of user equipments, of a corresponding partition, of the partitions of the machine learning model, based, at least partially, on the one or more groups of the plurality of user equipments; means for causing transmitting, to the plurality of user equipments, of an indication to record measurements for the first cell with a configured frequency for a configured time period; means for causing receiving, from at least one of the plurality of user equipments, of at least one message regarding a handover failure, wherein the at least one message may comprise a message generated using a first partition of the partitions of the machine learning model; and means for determining, with a second partition of the partitions of the machine learning model, whether the first cell is a rogue base station based, at least partially, on a plurality of detection reports, wherein the plurality of detection reports may comprise, at least, the at least one received message.

In accordance with one example embodiment, an apparatus may comprise: at least one processor; and at least one memory storing instructions that, when executed by the at least one processor, cause the apparatus at least to: receive a request for information associated with the apparatus; transmit the requested information; receive, in response to the requested information, a partition of a machine learning model; receive an indication to record measurements for a first cell with a configured frequency for a configured time period; record the measurements for the first cell with the configured frequency for the configured time period; detect a handover failure towards the first cell; analyze the recorded measurements during a first time period before the handover failure and during a second time period after the handover failure using the partition of the machine learning model; and transmit a result of the analysis of the recorded measurements.

The transmitted information may comprise at least one of: a battery status of the apparatus, a power saving mode of the apparatus, an amount of memory available for the apparatus, a type of the apparatus, a machine learning processing capability of the apparatus, or a processing capability of the apparatus.

The measurements may comprise one of: a signal to inference plus noise ratio, or a reference signal received power.

Transmitting the result of the analysis of the recorded measurements may comprise the example apparatus being further configured to: transmit a time stamp and a physical cell identifier associated with the handover failure detected via the analysis of the recorded measurements.

In accordance with one aspect, an example method may be provided comprising: receiving, with a user equipment, a request for information associated with the user equipment; transmitting the requested information; receiving, in response to the requested information, a partition of a machine learning model; receiving an indication to record measurements for a first cell with a configured frequency for a configured time period; recording the measurements for the first cell with the configured frequency for the configured time period; detecting a handover failure towards the first cell; analyzing the recorded measurements during a first time period before the handover failure and during a second time period after the handover failure using the partition of the machine learning model; and transmitting a result of the analysis of the recorded measurements.

The transmitted information may comprise at least one of: a battery status of the user equipment, a power saving mode of the user equipment, an amount of memory available for the user equipment, a type of the user equipment, a machine learning processing capability of the user equipment, or a processing capability of the user equipment.

The measurements may comprise one of: a signal to inference plus noise ratio, or a reference signal received power.

Transmitting the result of the analysis of the recorded measurements may comprise: transmitting a time stamp and a physical cell identifier associated with the handover failure detected via the analysis of the recorded measurements.

In accordance with one example embodiment, an apparatus may comprise: circuitry configured to perform: receiving a request for information associated with the apparatus; transmitting the requested information; circuitry configured to perform: receiving, in response to the requested information, a partition of a machine learning model; circuitry configured to perform: receiving an indication to record measurements for a first cell with a configured frequency for a configured time period; circuitry configured to perform: recording the measurements for the first cell with the configured frequency for the configured time period; circuitry configured to perform: detecting a handover failure towards the first cell; circuitry configured to perform: analyzing the recorded measurements during a first time period before the handover failure and during a second time period after the handover failure using the partition of the machine learning model; and circuitry configured to perform: transmitting a result of the analysis of the recorded measurements.

In accordance with one example embodiment, an apparatus may comprise: processing circuitry; memory circuitry including computer program code, the memory circuitry and the computer program code configured to, with the processing circuitry, enable the apparatus to: receive a request for information associated with the apparatus; transmit the requested information; receive, in response to the requested information, a partition of a machine learning model; receive an indication to record measurements for a first cell with a configured frequency for a configured time period; record the measurements for the first cell with the configured frequency for the configured time period; detect a handover failure towards the first cell; analyze the recorded measurements during a first time period before the handover failure and during a second time period after the handover failure using the partition of the machine learning model; and transmit a result of the analysis of the recorded measurements.

In accordance with one example embodiment, an apparatus may comprise means for performing: receiving a request for information associated with the apparatus; transmitting the requested information; receiving, in response to the requested information, a partition of a machine learning model; receiving an indication to record measurements for a first cell with a configured frequency for a configured time period; recording the measurements for the first cell with the configured frequency for the configured time period; detecting a handover failure towards the first cell; analyzing the recorded measurements during a first time period before the handover failure and during a second time period after the handover failure using the partition of the machine learning model; and transmitting a result of the analysis of the recorded measurements.

The transmitted information may comprise at least one of: a battery status of the apparatus, a power saving mode of the apparatus, an amount of memory available for the apparatus, a type of the apparatus, a machine learning processing capability of the apparatus, or a processing capability of the apparatus.

The measurements may comprise one of: a signal to inference plus noise ratio, or a reference signal received power.

The means configured to perform transmitting the result of the analysis of the recorded measurements may comprise means configured to perform: transmitting a time stamp and a physical cell identifier associated with the handover failure detected via the analysis of the recorded measurements.

In accordance with one example embodiment, a non-transitory computer-readable medium comprising instructions stored thereon which, when executed with at least one processor, cause the at least one processor to: receive a request for information associated with the apparatus; transmit the requested information; receive, in response to the requested information, a partition of a machine learning model; receive an indication to record measurements for a first cell with a configured frequency for a configured time period; record the measurements for the first cell with the configured frequency for the configured time period; detect a handover failure towards the first cell; analyze the recorded measurements during a first time period before the handover failure and during a second time period after the handover failure using the partition of the machine learning model; and transmit a result of the analysis of the recorded measurements.

In accordance with one example embodiment, a non-transitory computer-readable medium comprising program instructions stored thereon for performing at least the following: causing receiving of a request for information associated with the apparatus; causing transmitting of the requested information; causing receiving, in response to the requested information, of a partition of a machine learning model; causing receiving of an indication to record measurements for a first cell with a configured frequency for a configured time period; recording the measurements for the first cell with the configured frequency for the configured time period; detecting a handover failure towards the first cell; analyzing the recorded measurements during a first time period before the handover failure and during a second time period after the handover failure using the partition of the machine learning model; and causing transmitting of a result of the analysis of the recorded measurements.

In accordance with another example embodiment, a non-transitory program storage device readable by a machine may be provided, tangibly embodying instructions executable by the machine for performing operations, the operations comprising: causing receiving of a request for information associated with the apparatus; causing transmitting of the requested information; causing receiving, in response to the requested information, of a partition of a machine learning model; causing receiving of an indication to record measurements for a first cell with a configured frequency for a configured time period; recording the measurements for the first cell with the configured frequency for the configured time period; detecting a handover failure towards the first cell; analyzing the recorded measurements during a first time period before the handover failure and during a second time period after the handover failure using the partition of the machine learning model; and causing transmitting of a result of the analysis of the recorded measurements.

In accordance with another example embodiment, a non-transitory computer-readable medium comprising instructions that, when executed by an apparatus, cause the apparatus to perform at least the following: causing receiving of a request for information associated with the apparatus; causing transmitting of the requested information; causing receiving, in response to the requested information, of a partition of a machine learning model; causing receiving of an indication to record measurements for a first cell with a configured frequency for a configured time period; recording the measurements for the first cell with the configured frequency for the configured time period; detecting a handover failure towards the first cell; analyzing the recorded measurements during a first time period before the handover failure and during a second time period after the handover failure using the partition of the machine learning model; and causing transmitting of a result of the analysis of the recorded measurements.

A computer implemented system comprising: at least one processor and at least one non-transitory memory storing instructions that, when executed by the at least one processor, cause the system at least to perform: causing receiving of a request for information associated with the apparatus; causing transmitting of the requested information; causing receiving, in response to the requested information, of a partition of a machine learning model; causing receiving of an indication to record measurements for a first cell with a configured frequency for a configured time period; recording the measurements for the first cell with the configured frequency for the configured time period; detecting a handover failure towards the first cell; analyzing the recorded measurements during a first time period before the handover failure and during a second time period after the handover failure using the partition of the machine learning model; and causing transmitting of a result of the analysis of the recorded measurements.

A computer implemented system comprising: means for causing receiving of a request for information associated with the apparatus; causing transmitting of the requested information; means for causing receiving, in response to the requested information, of a partition of a machine learning model; means for causing receiving of an indication to record measurements for a first cell with a configured frequency for a configured time period; means for recording the measurements for the first cell with the configured frequency for the configured time period; means for detecting a handover failure towards the first cell; means for analyzing the recorded measurements during a first time period before the handover failure and during a second time period after the handover failure using the partition of the machine learning model; and means for causing transmitting of a result of the analysis of the recorded measurements.

The term "non-transitory," as used herein, is a limitation of the medium itself (i.e. tangible, not a signal) as opposed to a limitation on data storage persistency (e.g., RAM vs. ROM).

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. An apparatus comprising:
at least one processor; and
at least one memory storing instructions that, when executed by the at least one processor, cause the apparatus at least to:
determine that a first cell is experiencing a rate of handover failure at or above a first threshold;
determine a list of physical cell identifiers of cells active at a time of the first cell experiencing the rate of handover failure at or above the first threshold, wherein the list of physical cell identifiers comprises, at least, a physical cell identifier associated with the first cell;
obtain information related to a plurality of user equipments, wherein respective ones of the plurality of user equipments have reported a reference signal received power measurement associated with at least one physical cell identifier of the determined list of physical cell identifiers;
categorize the plurality of user equipments into one or more groups of user equipments based, at least partially, on the obtained information;
obtain an indication of partitions of a machine learning model corresponding to respective ones of the one or more groups;
transmit, to the respective ones of the plurality of user equipments, a corresponding partition, of the partitions of the machine learning model, based, at least partially, on the one or more groups of the plurality of user equipments;
transmit, to the plurality of user equipments, an indication to record measurements for the first cell with a configured frequency for a configured time period;
receive, from at least one of the plurality of user equipments, at least one message regarding a handover failure, wherein the at least one message comprises a message generated using a first partition of the partitions of the machine learning model; and
determine, with a second partition of the partitions of the machine learning model, whether the first cell is a rogue base station based, at least partially, on a plurality of detection reports, wherein the plurality of detection reports comprises, at least, the at least one received message.

2. The apparatus of claim 1, wherein the obtained information comprises at least one of:
a battery status of a user equipment of the plurality of user equipments,
a power saving mode of the user equipment,
an amount of memory available for the user equipment,
a type of the user equipment,
a machine learning processing capability of the user equipment, or
a processing capability of the user equipment.

3. The apparatus of claim 2, wherein the at least one memory, storing the instructions, when executed by the at least one processor, causes the apparatus to:
subscribe to an analytics identifier associated with rogue base station detection;
request, from the plurality of user equipments, one or more L1 measurements that are respectively associated with rogue base station detection labels; and provide the one or more L1 measurements to a network data analytics function for training of the machine learning model.

4. The apparatus of claim 1, wherein the measurements comprise one of:

a signal to inference plus noise ratio, or a reference signal received power.

5. The apparatus of claim 1, wherein the at least one memory, storing the instructions, when executed by the at least one processor, causes the apparatus to:

perform authentication of the at least one received message.

6. The apparatus of claim 1, wherein the at least one message comprises, at least, a time stamp and a physical cell identifier associated with the handover failure.

7. The apparatus of claim 1, wherein the first partition is at least partially different from the second partition.

8. The apparatus of claim 1, wherein obtaining the indication of the partitions of the machine learning model comprises the at least one memory, storing the instructions, when executed by the at least one processor, causes the apparatus to:

provide the information related to the plurality of user equipments, information associated with the one or more groups, and information associated with the apparatus to a network data analytics function; and receive, from the network data analytics function, the indication of the partitions of the machine learning model, and the machine learning model, wherein the indication of the partitions of the machine learning model comprises a split management table.

9. The apparatus of claim 1, wherein determining that the first cell is experiencing the rate of handover failure at or above the first threshold comprises the at least one memory, storing the instructions, when executed by the at least one processor, causes the apparatus to:

receive, from an operations, administration, and maintenance function, a request to activate rogue base station detection with respect to the first cell.

10. The apparatus of claim 1, wherein the indication to record measurements for the first cell with the configured frequency for the configured time period comprises an indication to record at least one measurement during a first time period prior to the handover failure and to record at least one measurement during a second time period after the handover failure.

11. A method comprising:

determining, with a first user equipment, that a first cell is experiencing a rate of handover failure at or above a first threshold;

determining a list of physical cell identifiers of cells active at a time of the first cell experiencing the rate of handover failure at or above the first threshold, wherein the list of physical cell identifiers comprises, at least, a physical cell identifier associated with the first cell;

obtaining information related to a plurality of user equipments, wherein respective ones of the plurality of user equipments have reported a reference signal received power measurement associated with at least one physical cell identifier of the determined list of physical cell identifiers;

categorizing the plurality of user equipments into one or more groups of user equipments based, at least partially, on the obtained information;

obtaining an indication of partitions of a machine learning model corresponding to respective ones of the one or more groups;

transmitting, to the respective ones of the plurality of user equipments, a corresponding partition, of the partitions of the machine learning model, based, at least partially, on the one or more groups of the plurality of user equipments;

transmitting, to the plurality of user equipments, an indication to record measurements for the first cell with a configured frequency for a configured time period;

receiving, from at least one of the plurality of user equipments, at least one message regarding a handover failure, wherein the at least one message comprises a message generated using a first partition of the partitions of the machine learning model; and determining, with a second partition of the partitions of the machine learning model, whether the first cell is a rogue base station based, at least partially, on a plurality of detection reports, wherein the plurality of detection reports comprises, at least, the at least one received message.

* * * * *